US009767414B2

(12) United States Patent
Maruhashi et al.

(10) Patent No.: US 9,767,414 B2
(45) Date of Patent: Sep. 19, 2017

(54) COMMUNICATION CONDITION BETWEEN ENTITIES DETECTION DISPLAYING AT LEAST PARTIAL GRAPHS INDICATING A LOCATION WHERE A DETECTED CHANGE OCCURRED

(71) Applicant: FUJITSU LIMITED, Kawasaki-shi, Kanagawa (JP)

(72) Inventors: Koji Maruhashi, Hachioji (JP); Nobuhiro Yugami, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 581 days.

(21) Appl. No.: 14/263,100

(22) Filed: Apr. 28, 2014

(65) Prior Publication Data
US 2014/0344207 A1 Nov. 20, 2014

(30) Foreign Application Priority Data

May 16, 2013 (JP) .................. 2013-103820

(51) Int. Cl.
*G06F 17/00* (2006.01)
*G06N 7/00* (2006.01)

(52) U.S. Cl.
CPC .................. *G06N 7/005* (2013.01)

(58) Field of Classification Search
CPC ..... G06F 17/30958; G06N 5/02; G06Q 50/01
USPC ...................................... 706/15, 45
See application file for complete search history.

(56) References Cited

U.S. PATENT DOCUMENTS

2006/0062157 A1 3/2006 Yamamoto

FOREIGN PATENT DOCUMENTS

| JP | 7-244689 | 9/1995 |
| JP | 2006-91971 | 4/2006 |
| JP | 2012-160015 | 8/2012 |

OTHER PUBLICATIONS

Pouliquen, et al., Multilingual multi-document continuously-updated social networks, 2007, Workshop Multi-source, Multilingual Information Extraction and Summarization '2007—Borovets, Bulgaria, pp. 25-32.*
Yin et al., A Unified Framework for Link Recommendation Using Random Walks, 2010, International Conference on Advances in Social Networks Analysis and Mining, IEEE, pp. 152-159.*

(Continued)

*Primary Examiner* — David Vincent
(74) *Attorney, Agent, or Firm* — Fujitsu Patent Center

(57) ABSTRACT

A computing unit obtains a graph including nodes and edges and representing a communication condition at first timing and at second timing and detects an edge that is added between the first and second timing among the edges. The computing unit calculates probabilities of transmitting information from each node to nodes coupled to the added edge, selects a subset of the nodes based on the calculated probabilities, selects nodes included in the subset as the starting points of information, calculates first probabilities of transmitting information from the selected nodes to each node based on the graph obtained at the first timing and second probabilities of transmitting information from the selected nodes to each node based on the graph obtained at the second timing, and detects a change in the communication condition between the first and second timing by comparing the first probabilities with the second probabilities.

7 Claims, 20 Drawing Sheets

(56) References Cited

OTHER PUBLICATIONS

Marcus, et al., Social Network Analysis, 2006, Wiley Interscience, pp. 1-18.*
Jia-Yu Pan et al., "Automatic Multimedia Cross-modal Correlation Discovery," Proceedings of the 10th ACM SIGKDD Conference 2004, Seattle, WA, Aug. 22-25, 2004.
Hanghang Tong et al., "Fast Random Walk with Restart and its Applications," IEEE International Conference on Data Mining (ICDM), Dec. 18-22, 2006.
Hanghang Tong et al., "Proximity Tracking on Time-Evolving Bipartite Graphs," SIAM Conference on Data Mining (SDM) Apr. 24-26, 2008.
Yasuhiro Fujiwara_et al., "Fast and Exact Top-k Search for Random Walk with Restart," Proceedings of the VLDB Endowment vol. 5, No. 5, Jan. 2012, pp. 442-453.
Takeaki Uno, "A Polynomial Time Delay Pseudo Clique Enumeration Algorithm," IPSJ SIG Technical Reports vol. 2007, No. 23, Mar. 9, 2007. English Abstract.
Takeaki Uno, "Fast Algorithms for Enumerating Cliques in Huge Graphs," IEICE Technical Report vol. 103, No. 31, Apr. 18, 2003. English Abstract.

* cited by examiner

|     | 1 | ② | ③ | ④ | 5 | 6 | 7 | 8 | 9 | 10 | ⑪ | ⑫ |
|-----|---|---|---|---|---|---|---|---|---|----|---|---|
| 1   | – | – | – | – | – | – | – | – | – | –  | – | – |
| 2   | – | – | – | – | – | – | – | – | – | –  | – | – |
| 3   | – | – | – | – | – | – | – | – | – | –  | – | – |
| ④   | 0.11 | 0.06 | 0.12 | 0.21 | 0.08 | 0.00 | 0.00 | 0.00 | 0.00 | 0.00 | 0.05 | 0.00 |
| ⑤   | 0.16 | 0.21 | 0.18 | 0.16 | 0.27 | 0.00 | 0.00 | 0.00 | 0.00 | 0.00 | 0.19 | 0.00 |
| ⑥   | 0.00 | 0.00 | 0.00 | 0.00 | 0.00 | 0.21 | 0.08 | 0.12 | 0.06 | 0.11 | 0.00 | 0.05 |
| ⑦   | 0.00 | 0.00 | 0.00 | 0.00 | 0.00 | 0.16 | 0.27 | 0.18 | 0.21 | 0.16 | 0.00 | 0.19 |
| 8   | – | – | – | – | – | – | – | – | – | –  | – | – |
| 9   | – | – | – | – | – | – | – | – | – | –  | – | – |
| 10  | – | – | – | – | – | – | – | – | – | –  | – | – |
| ⑪   | 0.05 | 0.15 | 0.06 | 0.05 | 0.09 | 0.00 | 0.00 | 0.00 | 0.00 | 0.00 | 0.23 | 0.00 |
| ⑫   | 0.00 | 0.00 | 0.00 | 0.00 | 0.00 | 0.05 | 0.09 | 0.06 | 0.15 | 0.05 | 0.00 | 0.23 |

NEIGHBORING NODE GROUP (columns 1–10)

NEIGHBORING NODE GROUP (columns 11–12)

| | 1 | 2 | 3 | 4 | 5 | 6 | 7 | 8 | 9 | 10 | 11 | 12 |
|---|---|---|---|---|---|---|---|---|---|---|---|---|
| 1 | — | 0.06 | 0.12 | 0.11 | 0.08 | 0.00 | 0.00 | 0.00 | 0.00 | — | 0.05 | 0.00 |
| 2 | — | 0.32 | 0.13 | 0.12 | 0.21 | 0.00 | 0.00 | 0.00 | 0.00 | — | 0.29 | 0.00 |
| 3 | — | 0.20 | 0.39 | 0.35 | 0.27 | 0.00 | 0.00 | 0.00 | 0.00 | — | 0.18 | 0.00 |
| 4 | — | 0.06 | 0.12 | 0.21 | 0.08 | 0.00 | 0.00 | 0.00 | 0.00 | — | 0.05 | 0.00 |
| 5 | — | 0.21 | 0.18 | 0.16 | 0.27 | 0.00 | 0.00 | 0.00 | 0.00 | — | 0.19 | 0.00 |
| 6 | — | 0.00 | 0.00 | 0.00 | 0.00 | 0.21 | 0.08 | 0.12 | 0.06 | — | 0.00 | 0.05 |
| 7 | — | 0.00 | 0.00 | 0.00 | 0.00 | 0.16 | 0.27 | 0.18 | 0.21 | — | 0.00 | 0.19 |
| 8 | — | 0.00 | 0.00 | 0.00 | 0.00 | 0.35 | 0.27 | 0.39 | 0.20 | — | 0.00 | 0.29 |
| 9 | — | 0.00 | 0.00 | 0.00 | 0.00 | 0.12 | 0.21 | 0.13 | 0.32 | — | 0.00 | 0.05 |
| 10 | — | 0.00 | 0.00 | 0.00 | 0.00 | 0.11 | 0.08 | 0.12 | 0.06 | — | 0.00 | 0.00 |
| 11 | — | 0.15 | 0.06 | 0.05 | 0.09 | 0.00 | 0.00 | 0.00 | 0.00 | — | 0.23 | 0.00 |
| 12 | — | 0.00 | 0.00 | 0.00 | 0.00 | 0.05 | 0.09 | 0.06 | 0.15 | — | 0.00 | 0.23 |

FIG. 12

|    | 1 | 2 | 3 | 4 | 5 | 6 | 7 | 8 | 9 | 10 | 11 | 12 |
|----|---|------|------|------|------|------|------|------|------|----|------|------|
| 1  | — | 0.02 | 0.07 | 0.03 | 0.03 | 0.02 | 0.02 | 0.02 | 0.02 | —  | 0.01 | 0.01 |
| 2  | — | 0.18 | 0.04 | 0.04 | 0.06 | 0.04 | 0.04 | 0.03 | 0.05 | —  | 0.11 | 0.08 |
| 3  | — | 0.06 | 0.22 | 0.10 | 0.09 | 0.07 | 0.07 | 0.06 | 0.05 | —  | 0.05 | 0.05 |
| 4  | — | 0.08 | 0.14 | 0.21 | 0.12 | 0.12 | 0.11 | 0.10 | 0.08 | —  | 0.07 | 0.07 |
| 5  | — | 0.16 | 0.16 | 0.15 | 0.23 | 0.14 | 0.13 | 0.11 | 0.10 | —  | 0.11 | 0.10 |
| 6  | — | 0.08 | 0.10 | 0.12 | 0.11 | 0.21 | 0.12 | 0.14 | 0.08 | —  | 0.07 | 0.07 |
| 7  | — | 0.10 | 0.11 | 0.14 | 0.13 | 0.15 | 0.23 | 0.16 | 0.16 | —  | 0.10 | 0.11 |
| 8  | — | 0.05 | 0.06 | 0.07 | 0.07 | 0.10 | 0.09 | 0.22 | 0.06 | —  | 0.05 | 0.05 |
| 9  | — | 0.05 | 0.03 | 0.04 | 0.04 | 0.04 | 0.06 | 0.04 | 0.18 | —  | 0.08 | 0.11 |
| 10 | — | 0.02 | 0.02 | 0.02 | 0.02 | 0.03 | 0.03 | 0.07 | 0.02 | —  | 0.01 | 0.01 |
| 11 | — | 0.11 | 0.03 | 0.03 | 0.05 | 0.03 | 0.04 | 0.03 | 0.08 | —  | 0.21 | 0.13 |
| 12 | — | 0.08 | 0.03 | 0.03 | 0.04 | 0.03 | 0.05 | 0.03 | 0.11 | —  | 0.13 | 0.21 |

|    | 1 | 2 | 3 | 4 | 5 | 6 | 7 | 8 | 9 | 10 | 11 | 12 |
|----|---|---|---|---|---|---|---|---|---|----|----|----|
| 1  | — | −0.04 | −0.05 | −0.08 | −0.05 | 0.02 | 0.02 | 0.02 | 0.02 | — | −0.04 | 0.01 |
| 2  | — | −0.14 | −0.09 | −0.08 | −0.14 | 0.04 | 0.04 | 0.03 | 0.05 | — | −0.18 | 0.08 |
| 3  | — | −0.14 | −0.17 | −0.25 | −0.17 | 0.07 | 0.07 | 0.06 | 0.05 | — | −0.13 | 0.05 |
| 4  | — | 0.02 | 0.02 | 0.00 | 0.04 | 0.12 | 0.11 | 0.10 | 0.08 | — | 0.01 | 0.07 |
| 5  | — | −0.05 | −0.02 | −0.01 | −0.04 | 0.14 | 0.13 | 0.11 | 0.10 | — | −0.07 | 0.10 |
| 6  | — | 0.08 | 0.10 | 0.12 | 0.11 | 0.00 | 0.04 | 0.02 | 0.02 | — | 0.07 | 0.01 |
| 7  | — | 0.10 | 0.11 | 0.14 | 0.13 | −0.01 | −0.04 | −0.02 | −0.05 | — | 0.10 | −0.07 |
| 8  | — | 0.05 | 0.06 | 0.07 | 0.07 | −0.25 | −0.17 | −0.17 | −0.14 | — | 0.05 | −0.13 |
| 9  | — | 0.05 | 0.03 | 0.04 | 0.04 | −0.08 | −0.14 | −0.09 | −0.14 | — | 0.08 | −0.18 |
| 10 | — | 0.02 | 0.02 | 0.02 | 0.02 | −0.08 | −0.05 | −0.05 | −0.04 | — | 0.01 | −0.04 |
| 11 | — | −0.03 | −0.03 | −0.02 | −0.05 | 0.03 | 0.04 | 0.03 | 0.08 | — | −0.02 | 0.13 |
| 12 | — | 0.08 | 0.03 | 0.03 | 0.04 | −0.02 | −0.05 | −0.03 | −0.03 | — | 0.13 | −0.02 |

FIG. 14

NEIGHBORING NODE GROUP

COMMUNICATION CONDITION BETWEEN ENTITIES DETECTION DISPLAYING AT LEAST PARTIAL GRAPHS INDICATING A LOCATION WHERE A DETECTED CHANGE OCCURRED

CROSS-REFERENCE TO RELATED APPLICATION

This application is based upon and claims the benefit of priority of the prior Japanese Patent Application No. 2013-103820, filed on May 16, 2013, the entire contents of which are incorporated herein by reference.

FIELD

The embodiments discussed herein are related to a communication condition change detection method and a communication condition change detection apparatus.

BACKGROUND

Today, users use various types of client apparatuses (for example, computers, mobile terminals, and so on). By operating such client apparatuses, the users are able to access a server apparatus on a network, and use services provided by the server apparatus. For example, there is a service called a social network service (SNS). The SNS connects multiple users through a network, and helps the users to interact with each other.

On SNS, users transmit information to other already connected users by operating their client apparatuses. For example, a first user transmits information indicating that the first user likes certain content on a Web page to a server apparatus from his client apparatus. Then, the server apparatus transmits information indicating that the first user likes the content to a second user who is connected to the first user. If the second user who has received the information also likes the content, the second user may transmit such information to a third user in the same way. Thus, the information may be transmitted to users who are not directly connected to the first user who originated the information. The users are able to increase the number of recipients of information by making more connections with other users.

Meanwhile, there has been proposed a method of analyzing communication of information based on connections between users on SNS. For example, connections between users may be represented by a graph in which users are represented as nodes and connections between the users are represented as edges (lines connecting the nodes). By performing predetermined operations using an adjacency matrix representing such a graph, an indicator called Random Walk with Restart (RWR) is calculated. The RWR is an indicator representing the probability that, when information is transmitted from a starting node through a random path along the edges, the information reaches an end node of interest. For example, there has been proposed a method of tracking changes in the RWRs between the nodes specified by the user, in the case where edges are added as time passes. This method performs a fast update of data used for approximate calculation of the RWRs between the specified nodes, only for a small number of added edges.

Examples of the related art are disclosed in:
Jia-Yu Pan et al, "Automatic Multimedia Cross-modal Correlation Discovery", Proceedings of SIGKDD 2004, ACM SIGKDD, 2004; and Hanghang Tong et al., "Proximity Tracking on Time-Evolving Bipartite Graphs", Proceedings of SDM2008, SIAM, 2008, p. 704-715.

New connections are made between information entities (for example, users) as time passes. This is represented as addition of edges between the nodes in a graph. For example, when an edge is added between first and second nodes representing first and second information entities, this indicates that direct communication between the first and second information entities is enabled. If the second information entity has an existing connection to a third information entity, information originated from the first information entity is more likely to be transmitted to the third information entity and other information entities therearound through the second information entity. That is, addition of a small number of edges may significantly increase the communication range which has been only locally established.

SUMMARY

According to one aspect of the invention, there is provided a communication condition change detection method that includes: obtaining a graph representing a communication condition at a first timing and at a second timing, the graph including a plurality of nodes representing information entities that transmit, forward, and receive information and a plurality of edges representing communication between the plurality of nodes; detecting an edge that is added between the first timing and the second timing among the edges; calculating, by a processor, probabilities that information is transmitted from each node to nodes coupled to the added edge; selecting a subset of the plurality of nodes based on the calculated probabilities; selecting nodes included in the subset as starting points of information; calculating first probabilities that information is transmitted from the selected nodes to each node based on the graph obtained at the first timing and second probabilities that information is transmitted from the selected nodes to each node based on the graph obtained at the second timing; and detecting a change in the communication condition between the first timing and the second timing by comparing the first probabilities with the second probabilities.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates a first example of RWRs at time t−1 according to the second embodiment;

FIG. 12 illustrates a second example of RWRs at time t−1 according to the second embodiment;

FIG. 13 illustrates an example of RWRs at time t according to the second embodiment;

FIG. 14 illustrates an example of a location where a change is detected according to the second embodiment;

DESCRIPTION OF EMBODIMENTS

Figure 1:
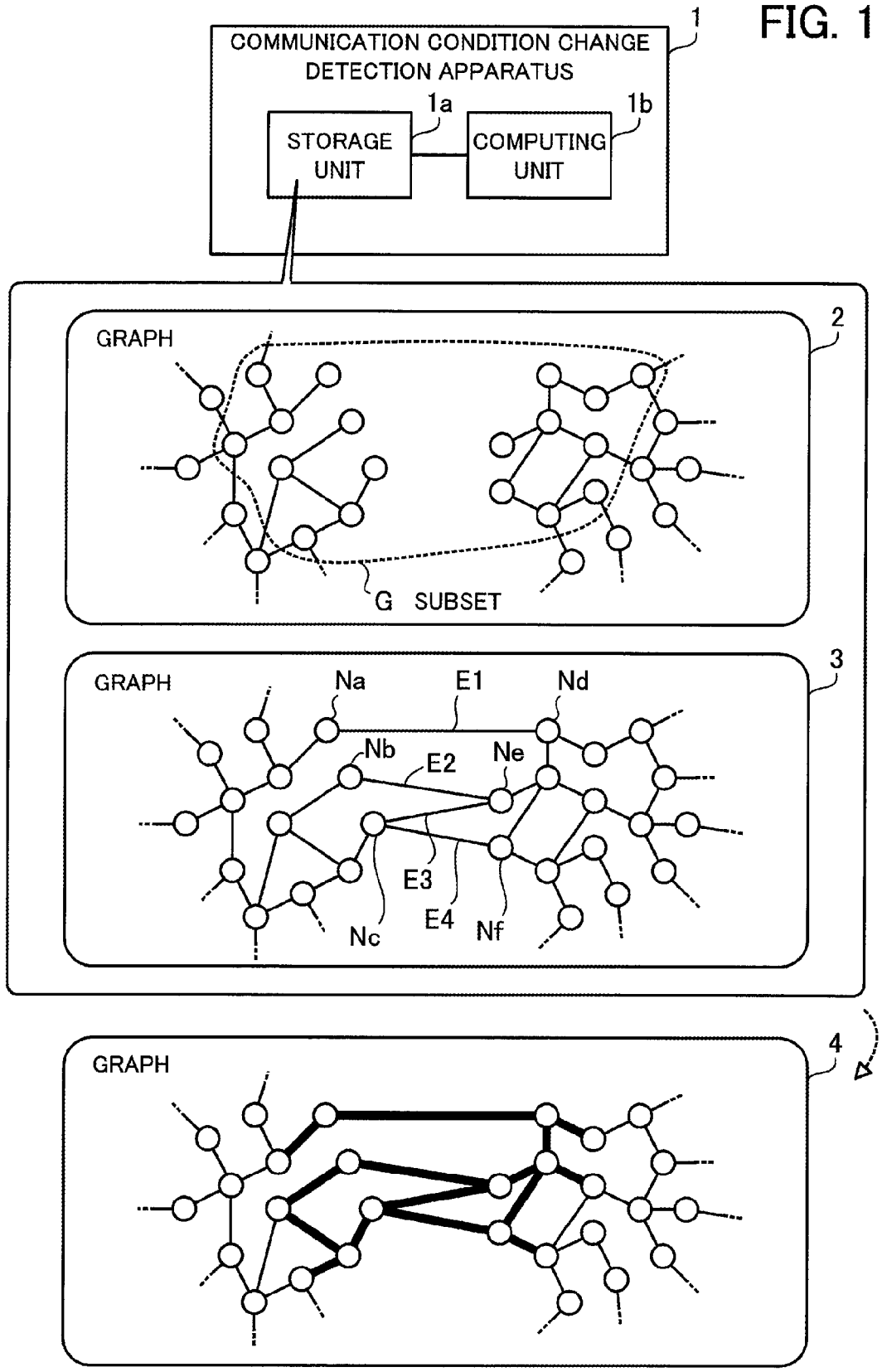
FIG. 1 illustrates a communication condition change detection apparatus according to a first embodiment.

Changes in communication conditions may be the subject of analysis. For example, if an active communication is detected between two groups having preferences in different product areas, this information may be used for marketing purposes. Further, if an active discussion is detected between research groups of different technical fields, this information may be used for analyzing changes in technical trends. For making an analysis, for example, changes in the condition of communications from all nodes to all nodes may be calculated so as to determine the locations where changes have occurred. However, there exist a number of connections between information entities, and a huge number of nodes and edges may be contained in a graph to be analyzed. Therefore, if changes in the condition of communications from all nodes to all nodes are calculated, the calculation cost might be increased.

Several embodiments will be described below with reference to the accompanying drawings, wherein like reference numerals refer to like elements throughout.

(a) First Embodiment

FIG. 1 illustrates a communication condition change detection apparatus 1 according to a first embodiment. The communication condition change detection apparatus 1 detects a change in the condition of communications between information entities that are capable of transmitting, forwarding, and receiving information. The information entity may be a person or a machine. If the information entity is a machine, the information entity may be an information processing apparatus such as computer and the like, or an electronic apparatus such as mobile phone, mobile terminal, and the like.

The communication condition change detection apparatus 1 includes a storage unit 1a and a computing unit 1b. The storage unit 1a may be a volatile storage device such as random access memory (RAM) and the like, or may be a non-volatile storage device such as hard disk drive (HDD), flash memory, and the like. The computing unit 1b may include a central processing unit (CPU), a digital signal processor (DSP), an application specific integrated circuit (ASIC), a field programmable gate array (FPGA), and the like. The computing unit 1b may be a processor that performs a program. The term "processor" as used herein refers to a set of plurality of processors (multiprocessor) as well as a single processor.

The storage unit 1a stores graphs 2 and 3 each containing a plurality of nodes representing information entities and a plurality of edges representing communication between the plurality of nodes. The graph 2 (first graph) represents the communication condition at a first timing. The graph 3 (second graph) represents the communication condition at a second timing. For example, the second timing is timing after the first timing.

For example, the graph 3 contains nodes Na, Nb, Nc, Nd, Ne, and Nf and edges E1, E2, E3, and E4. The edge E1 represents communication between the nodes Na and Nd. The edge E2 represents communication between the nodes Nb and Ne. The edge E3 represents communication between the nodes Nc and Ne. The edge E4 represents communication between the nodes Nc and Nf.

The computing unit 1b detects edges added between the first timing and the second timing, based on the graphs 2 and 3. For example, the graph 2 does not contain any of the edges E1, E2, E3, and E4. In this case, the computing unit 1b detects the added edges E1, E2, E3, and E4 by comparing the edges contained in the graphs 2 with the edges contained in the graph 3. The computing unit 1b may detect two or more added edges.

The computing unit 1b calculates probabilities that information is transmitted from each node (starting node) to nodes (end nodes) connected to any of the added edges. In the case of the graph 3, nodes that are connected to any of the added edges E1, E2, E3, and E4 are the nodes Na, Nb, Nc, Nd, Ne, and Nf. For example, the computing unit 1b calculates RWRs from each node to the nodes Na, Nb, Nc, Nd, Ne, and Nf, based on the graph 2. The RWRs are indicators of the probabilities that information is transmitted from each starting node to each of the end nodes Na, Nb, Nc, Nd, Ne, and Nf.

The computing unit 1b selects a subset G of a plurality of nodes, based on the calculated probabilities. For example, the computing unit 1b may select the subset G based on the highest probability among the probabilities calculated for each starting node. For instance, the computing unit 1b may select nodes whose highest probability is greater than a predetermined threshold as elements of the subset G.

The computing unit 1b selects nodes contained in the subset G as the starting points of information, and calculates first probabilities that information is transmitted to each node based on the graph 2, and second probabilities that information is transmitted to each node based on the graph 3. The computing unit 1b detects a change in the communication condition between the first and second timings by comparing the first probabilities with the second probabilities.

For example, the computing unit 1b calculates, as first probabilities, RWRs from the nodes contained in the subset G to each node, based on the graph 2. Further, for example, the computing unit 1b calculates, as second probabilities, RWRs from the nodes contained in the subset G to each node, based on the graph 3. Then, for instance, the computing unit 1b may detect an edge where the difference between the first and second probabilities is relatively large as a location where there is a change in the communication condition. In a graph 4, edges where a relatively large change is detected in the graph 3 are indicated by thicker lines than the other edges.

According to the communication condition change detection apparatus 1, the computing unit 1b detects the edges E1, E2, E3, and E4 that are added between the first timing and the second timing, based on the graphs 2 and 3. The computing unit 1b calculates the probabilities that information is transmitted from each node to the nodes Na, Nb, Nc, Nd, Ne, and Nf connected to any of the edges E1, E2, E3, and E4, and selects the subset G of a plurality of nodes based on the calculated probabilities. The computing unit 1b selects only the nodes contained in the subset G as the starting points of information, and calculates first probabilities that information is transmitted to each node based on the graph 2, and second probabilities that information is transmitted to each node based on the graph 3. The computing unit 1b detects a change in the communication condition between the first and second timings by comparing the first probabilities with the second probabilities.

Thus, it is possible to efficiently detect a location where there is a relatively large change in the communication condition due to addition of edges. For making an analysis, it might be an option to calculate RWRs by performing predetermined matrix operations on the entire graphs obtained at different timings, and compare the calculated RWRs, for example. However, the graph might contain a huge number of nodes. Therefore, in the case of performing operations on the entire graph, the memory usage might be increased, resulting in memory shortage. Further, the amount of computation might be increased as well.

In the case where information is transmitted from a first node to a second node, as the number of hops between the first and second nodes decreases (as the number of nodes through which information is transmitted decreases), the probability that information is transmitted increases. Further, as the number of redundant paths between the first and second nodes increases, the probability that information is transmitted increases. On the other hand, as the number of hops between the first and second nodes increases, the probability that information is transmitted decreases. Further, as the number of redundant paths between the first and second nodes decreases, the probability that information is transmitted decreases. That is, if a node has a smaller number of hops to the opposite ends of the added edge and has a greater number of redundant paths to the opposite ends of the added edge, its communication range is more likely to be relatively greatly increased due to addition of edges. On the other hand, if a node has a greater number of hops to the opposite ends of the added edge and has a smaller number of redundant paths to the opposite ends of the added edge, its communication range is less likely to be greatly increased due to addition of edges.

Further, in the case of performing operations on the entire graph, the operations are performed on even the nodes whose communication range is less likely to be greatly increased by addition of edges, which might result in wasteful memory usage and computation. For example, if probabilities that information is transmitted between all the nodes are calculated, the size of memory needed to store the results might be large. More specifically, in the case where the size of memory needed to store the calculation result of each node is 8 bytes and the number of nodes in the graph is 100 million, the size of memory needed to store all the results is as large as 80 petabytes.

In view of the above, the communication condition change detection apparatus 1 calculates probabilities that information is transmitted from each node to the nodes connected to the added edge, and selects the subset G based on the calculated probabilities. Then, the communication condition change detection apparatus 1 selects only the nodes contained in the subset G as the starting points of information, and calculates first and second probabilities that information is transmitted to each node.

In this way, recalculation of the information transmission probability is not performed for nodes whose communication range is less likely to be greatly increased by addition of edges. Accordingly, it is possible to reduce memory usage and the amount of computation, compared to the case where operations are performed on the entire first and second graphs. Further, it is possible to reduce wasteful memory usage and computation. Thus, it is possible to efficiently detect a location where there is a relatively large change in the communication condition due to addition of edges.

Note that the computing unit 1b may extract an edge contained in a subgraph that satisfies a predetermined condition from two or more added edges, select only the nodes connected to the extracted edge as the end points of information, and calculate the probabilities that information is transmitted from each node. Then, the computing unit 1b may select the subset G based on the calculated probabilities.

For example, the predetermined condition may be a condition that "a subgraph contains n (n is an integer equal to or greater than 3) or more nodes". If n=3, a subgraph formed with the nodes Na and Nd and the edge E1 does not satisfy the condition, and therefore is excluded from the subject of the probability calculation. On the other hand, a subgraph formed with the nodes Nb, Nc, Ne, and Nf and the edges E2, E3, and E4 satisfies the condition, and therefore is selected as the subject of the probability calculation. Thus, added edges contained in a subgraph having a predetermined size are selected from among all the added edges. Accordingly, in the case of detecting a change involving a node set having a predetermined size or greater, it is possible to improve the efficiency of computation.

A subgraph may be a clique or a pseudo clique. A clique is a subgraph in which there exist edges connecting each node in the subgraph to all the other nodes in the subgraph. A pseudo clique is a subgraph in which the ratio of edges connecting each node in the subgraph to the other nodes is equal to or greater than a predetermined threshold. In other words, cliques and pseudo cliques are subgraphs in which a plurality of nodes are densely connected. That is, changes in the communication condition due to addition of edges are likely to be greater in cliques and pseudo cliques than in other subgraphs. Therefore, it is possible to efficiently detect relatively large changes by selecting, as candidate elements of the subset G, nodes which are more likely to transmit information to cliques and pseudo cliques.

Further, the computing unit 1b may calculate, for each starting node, the sum of the probabilities that information is transmitted to a plurality of nodes connected to the edge contained in the subgraph that satisfies the predetermined condition, and select the subset G based on the sum. Thus, for example, it is possible to select only the starting nodes which are more likely to transmit information to the nodes contained in the subgraph. By narrowing down the elements of the subset G, it becomes possible to further reduce the memory usage and the amount of computation when calculating first and second probabilities in the subsequent steps.

Figure 2:
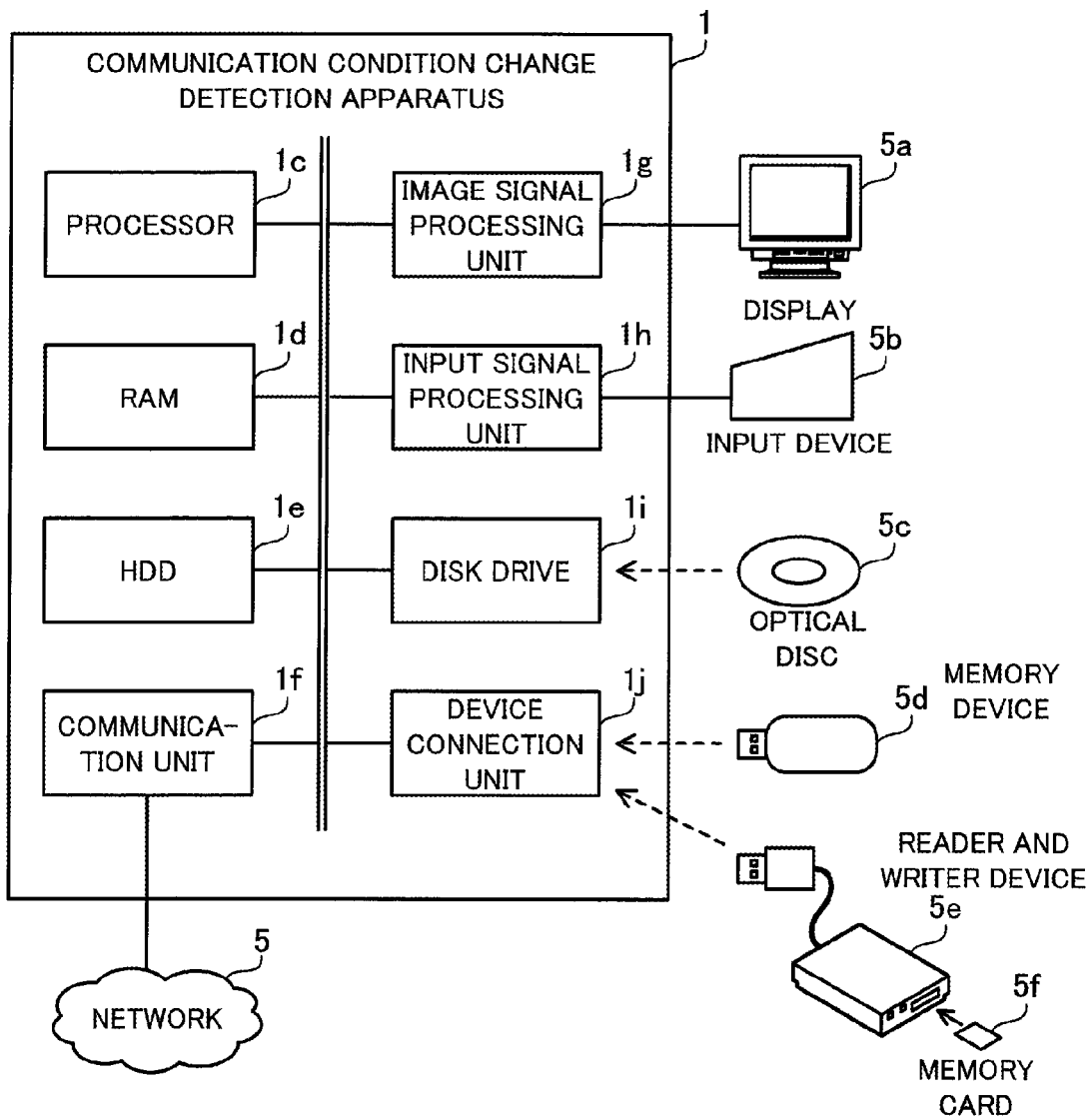
FIG. 2 illustrates an exemplary hardware configuration of the communication condition change detection apparatus according to the first embodiment.

FIG. 2 illustrates an exemplary hardware configuration of the communication condition change detection apparatus 1 according to the first embodiment. The communication condition change detection apparatus 1 includes a processor 1c, a RAM 1d, an HDD 1e, a communication unit 1f, an image signal processing unit 1g, an input signal processing unit 1h, a disk drive 1i, and a device connection unit 1j. Each unit is connected to a bus of the communication condition change detection apparatus 1.

The processor 1c controls information processing performed by the communication condition change detection apparatus 1. The processor 1c may be a multiprocessor. Examples of the processor 1c include a CPU, a DSP, an ASIC, an FPGA, a micro processing unit (MPU), a programmable logic device (PLD), and the like. The processor 1c may be a combination of two or more of the CPU, DSP, ASIC, FPGA, MPU, and PLD.

The RAM 1d is a primary storage device of the communication condition change detection apparatus 1. The RAM 1d temporarily stores at least part of the operating system (OS) program and application programs that are executed by the processor 1c. The RAM 1d also stores various types of data used in processing performed by the processor 1c.

The HDD 1e is a secondary storage device of the communication condition change detection apparatus 1. The HDD 1e magnetically writes data to and reads data from an internal magnetic disk. The HDD 1e stores the OS program, application programs, and various types of data. The communication condition change detection apparatus 1 may include other types of secondary storage devices such as a flash memory, a solid state drive (SSD), and the like, and may include a plurality of secondary storage devices.

The communication unit 1f is an interface capable of communicating with other computers via a network 5. The communication unit 1f may be a wired interface or a wireless interface.

The image signal processing unit 1g outputs an image to a display 5a connected to the communication condition change detection apparatus 1, in accordance with an instruction from the processor 1c. Examples of the display 5a include a cathode ray tube (CRT) display, a liquid crystal display, and the like.

The input signal processing unit 1h obtains an input signal from an input device 5b connected to the communication condition change detection apparatus 1, and outputs the input signal to the processor 1c. Examples of the input device 5b include pointing devices (such as a mouse, a touch panel, and the like), a keyboard, and the like.

The disk drive 1i is a drive unit that reads programs and data from an optical disc 5c by using laser beams or the like. Examples of the optical disc 5c include a digital versatile disc (DVD), a DVD-RAM, a compact disc read only memory (CD-ROM), a CD-Recordable (CD-R), a CD-Rewritable (CD-RW), and the like. The disc drive 1i reads the programs and data from the optical disc 5c, and stores the read programs and data in the RAM 1d or the HDD 1e, in accordance with an instruction from the processor 1c, for example.

The device connection unit 1j is a communication interface that connects peripheral devices to the communication condition change detection apparatus 1. For example, a memory device 5d and a reader and writer device 5e may be connected to the device connection unit 1j. The memory device 5d is a recording medium having a function for communicating with the device connection unit 1j. The reader and writer device 5e writes data to and reads data from a memory card 5f. The memory card 5f is a card-type recording medium. The device connection unit 1j reads programs and data from the memory device 5d or the memory card 5f, and stores the read programs and data in the RAM 1d or the HDD 1e, in accordance with an instruction from the processor 1c, for example.

With this hardware configuration, the communication condition change detection apparatus 1 is realized.

(b) Second Embodiment

Figure 3:
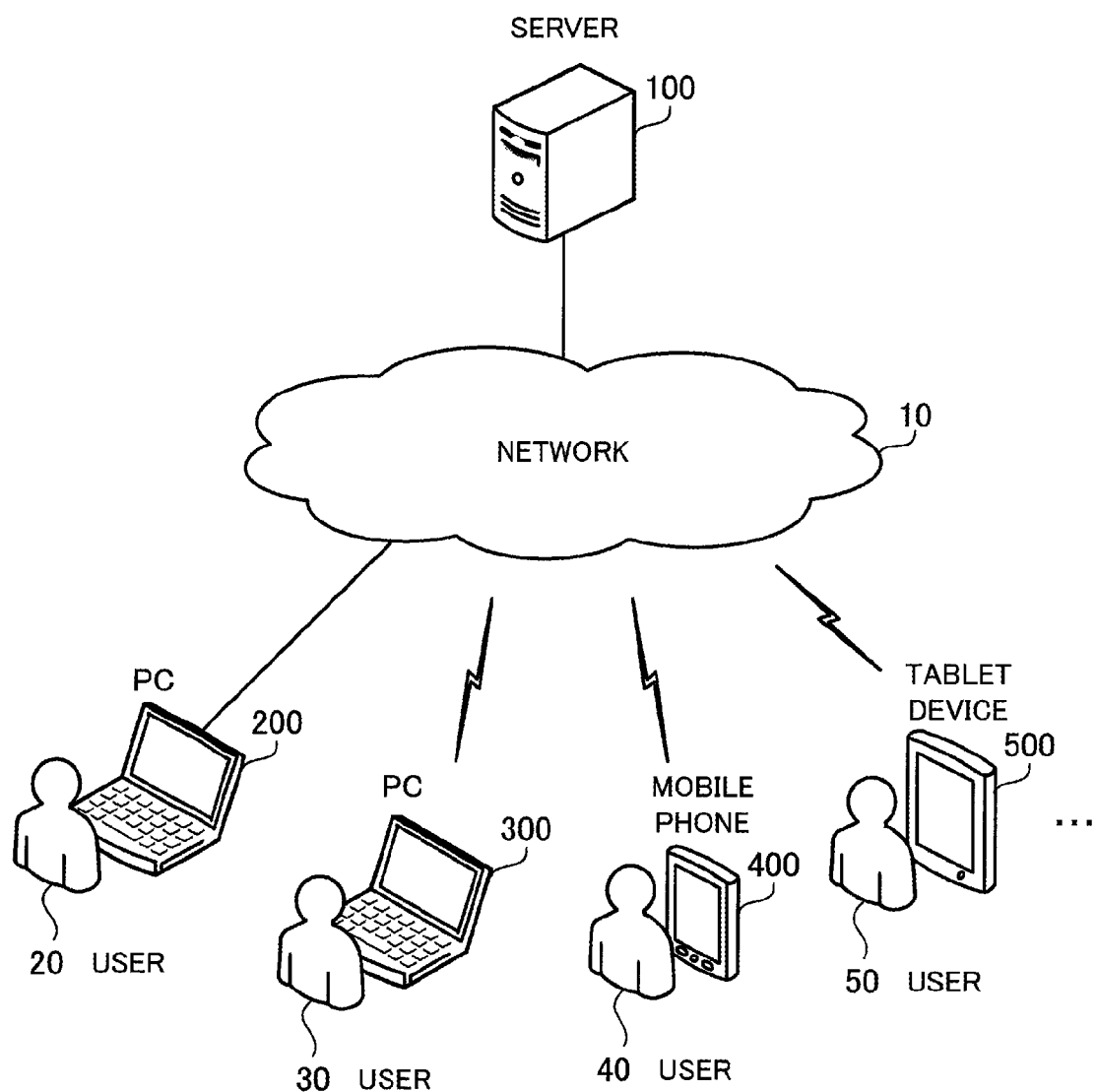
FIG. 3 illustrates an information processing system according to a second embodiment.

FIG. 3 illustrates an information processing system according to a second embodiment. The information processing system of the second embodiment includes a server 100, personal computers (PCs) 200 and 300, a mobile phone 400, and a tablet device 500. The server 100, the PCs 200 and 300, the mobile phone 400, and the tablet device 500 are connected to a network 10. The network 10 is the Internet, for example. The network 10 and these apparatuses may be connected through wires or wirelessly. Further, another network may be interposed between the network 10 and these apparatuses. Other than those illustrated in FIG. 3, various clients used by many users may be connected to the network 10.

The apparatuses that are used by the users, such as the PCs 200 and 300, the mobile phone 400, the tablet device 500, and the like, may be collectively referred to as "clients" or "client apparatuses". The users may use an SNS provided by the server 100 or another server connected to the network 10 by operating their clients.

The server 100 is a server computer that analyzes connections between users of the SNS. The server 100 performs analysis based on a graph representing connections between users. The SNS manages friendships between the users. For example, information indicating users who are friends of a user is stored in user management information. The server 100 may generate an analytical graph by referring to the management information. Alternatively, the server 100 may obtain an analytical graph from the other server storing the management information and providing the SNS.

The PC 200 is a client computer used by a user 20. The PC 300 is a client computer used by a user 30. The mobile phone 400 is an electronic device used by a user 40. The tablet device 500 is an electronic device used by a user 50. For example, the users 20, 30, 40, and 50 may use the SNS by using predetermined software or a Web browser executed by their clients.

For example, connections (friendships) between the users 20, 30, 40, and 50 are represented by a graph in which nodes represent the users 20, 30, 40, and 50 and edges represent connections. As the number of users of the SNS increases, the number of nodes increases, and the number of edges representing connections between users increases.

Figure 4:
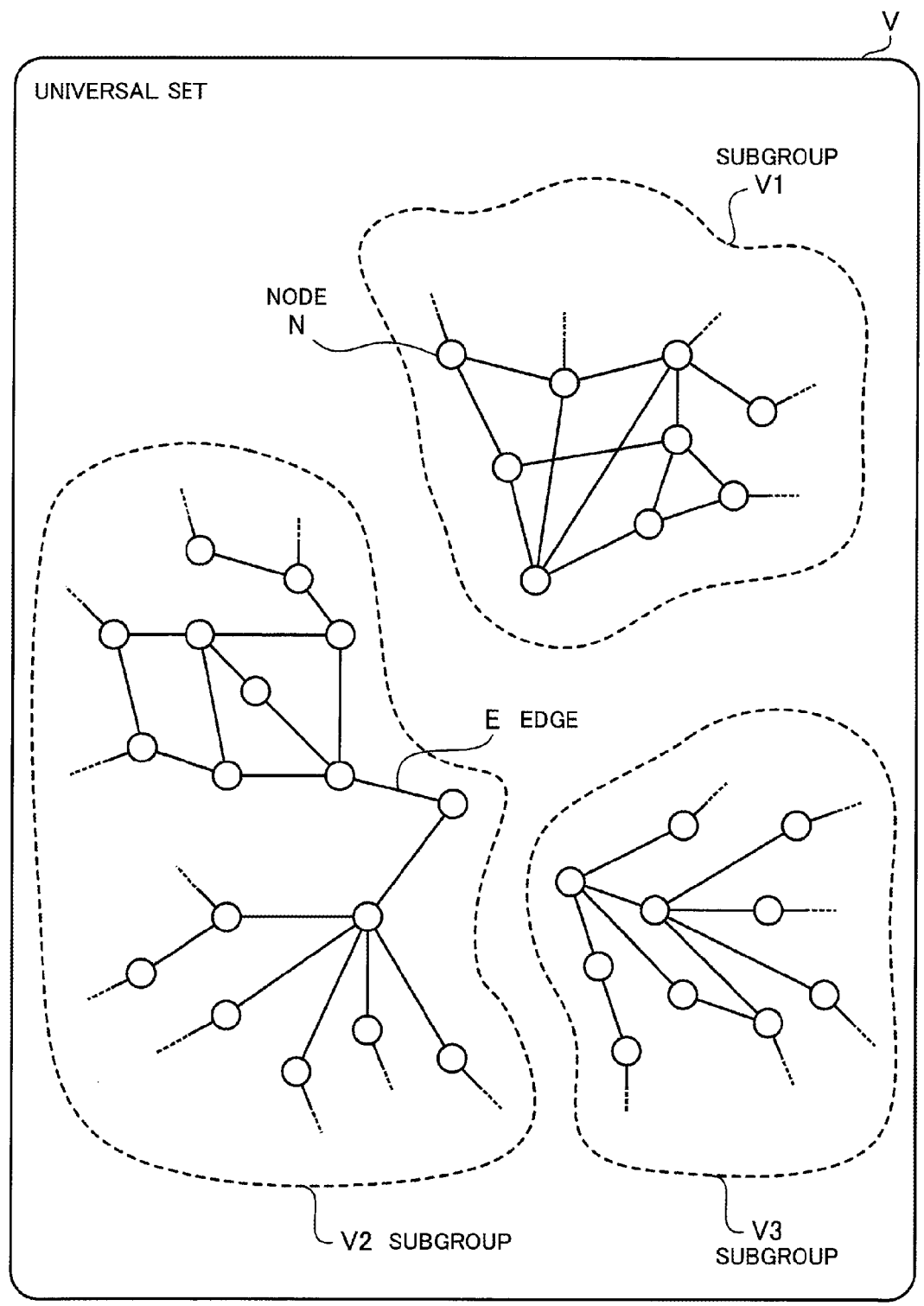
FIG. 4 illustrates an example of the entire graph according to the second embodiment.

FIG. 4 illustrates an example of the entire graph according to the second embodiment. A universal set V contains all the nodes using the SNS. Each node corresponds to a single user. If a user is a friend of another user, two nodes representing the two users are connected by an edge. In this way, connections between users of the SNS are represented by an undirected graph. In the graph, nodes are represented by circles (for example, nodes N). Further, edges are represented by lines (for example, edges E). Edges may also be referred to as "links".

The universal set V contains subgroups V1, V2, and V3. The subgroups V1, V2, and V3 are sets of nodes that are relatively densely arranged. For example, when a new connection is made between users of different subgroups, a new edge may be created between the subgroups. Then, communication between the subgroups is enabled through the edge. Each subgroup may contain a user or a group of users who are influential in communication of information (for example, a key person who has many friends and who collects information from a number of other users and distributes the collected information to a number of other users). For example, if influential users or influential groups become friends, the condition of communications between the subgroups may be greatly changed.

Such a relationship is observed in services other than SNS. For example, the subgroups V1, V2, and V3 may be groups that are divided according to a certain attribute, such as hobbies, jobs, fields of research and other activities, areas of concern and interest, the place of residence, year of birth, and so on.

For example, a joint authorship of paper may be represented by a graph. More specifically, the subgroup V1 may be a group of researchers in the field of biology; the subgroup V2 may be a group of researchers in the field of information sciences; and the subgroup V3 may be a group of researchers in the field of chemistry. For instance, if the systems biology becomes an increasingly active research area, a prominent researcher in the field of biology (subgroup V1) and a prominent researcher in the field of information sciences (subgroup V2) may jointly write a paper. Then, the condition of communications between the two fields (such as exchanging related papers between the two fields, and so on) may be greatly changed by many biologists and information scientists. Accordingly, although an SNS is described below as an example, the second embodiment may be applied to various types of services (for example, services for collecting and providing academic papers and the like) other than SNS.

Figure 5:
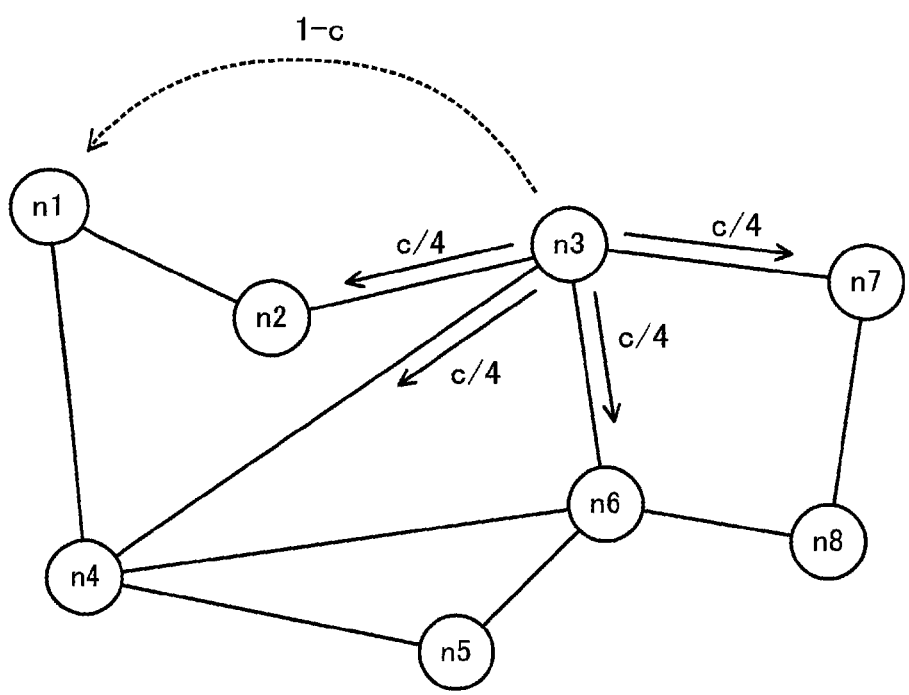
FIG. 5 illustrates an example of communication of information according to the second embodiment.

FIG. 5 illustrates an example of communication of information according to the second embodiment. FIG. 5 illustrates nodes n1, n2, n3, n4, n5, n6, n7, and n8, which are part of the universal set V. The nodes n1 and n2 are connected by an edge. In other words, the nodes n1 and n2 are connected to the opposite ends of the edge. Similarly, the nodes n1 and n4 are connected by an edge. The nodes n2 and n3 are connected by an edge. The nodes n3 and n4 are connected by an edge. The nodes n3 and n6 are connected by an edge. The nodes n3 and n7 are connected by an edge. The nodes n4 and n5 are connected by an edge. The nodes n3 and n6 are connected by an edge. The nodes n5 and n6 are connected by an edge. The nodes n6 and n8 are connected by an edge. The nodes n7 and n8 are connected by an edge. Nodes connected to the opposite ends of the same edge have an adjacency relationship. For example, the node n1 is an adjacent node of the nodes n2 and N4.

As the number of hops (that is, the number of friends needed for transmission) from a first user to a second user decreases, the probability that information is transmitted from the first user to the second user increases. Further, as the number of redundant paths from the first user to the second user increases, the probability that information is transmitted from the first user to the second user increases. Thus, an indicator called an RWR or an RWR distance may be used as an indicator for representing the closeness between nodes which is proportional to the probability that information is transmitted. More specifically, the probability that information generated in a first node is transmitted randomly along the edges to a second node is an RWR distance from the first node to the second node. As the number of hops between the first and second nodes decreases, the RWR distance increases, and information is more likely to be transmitted between the two nodes.

Transmission of information is modeled in the following way. Information is transmitted in accordance with the transition probability between nodes. More specifically, there are the following cases (1) through (3). (1) The obtained information is transmitted to at least one adjacent node with a probability of c (c is a real number satisfying $0<c<1$). (2) The obtained information is not transmitted to any of the adjacent nodes with a probability of 1−c. On the model, the information is retransmitted from the source node (the starting node which originated the information). (3) In the case where a node is adjacent to a plurality of nodes, the probabilities that information is transmitted to the respective adjacent nodes are equal. The probability c may vary depending on the service under analysis. In the second embodiment, c=0.8, for example.

For instance, assuming that information originated from the node n1 has reached the node n3, the probability that the information is transmitted from the node n3 to each adjacent node is as follows. The probabilities that the information is transmitted from the node n3 to the respective nodes n2, n4, n6, and n7 are c/4. The probability that the information is not transmitted from the node n3 to any of the nodes n2, n4, n6, and n7 (the probability that the information is retransmitted from the node n1) is 1−c.

The number of all the nodes of the universal set V is N (N is an integer greater than 1). The RWR distances from a node j ("j" is an identifier of the starting node) to all the nodes are held in a column vector $r_j$ with N rows. The column vector $r_j$ is expressed by the following equation (1):

$$r_j = cWr_j + (1-c)e_j \quad (1)$$

A matrix W is a transition probability matrix of N rows by N columns. A vector $e_j$ is a column vector whose entry corresponding to the node j is 1 and the other entries are 0. The matrix W is expressed by the following equation (2) using an adjacency matrix M representing a graph and a diagonal matrix D having the degrees (the number of edges connected to each node) as the diagonal entries. The adjacency matrix M is a matrix in which, if there is an edge between nodes i and j ("i" is an identifier of a node), the elements of the i-th row and j-th column and the j-th row and i-th column are "1". The other elements of the adjacency matrix M are "0".

$$W = MD^{-1} \quad (2)$$

The following equation (3) is obtained by solving the equation (1) for $r_j$.

$$r_j = (1-c)(I-cW)^{-1}e_j \quad (3)$$

A matrix I is an identity matrix of N rows by N columns. It is possible to calculate RWR distances $r_j$ from the node j to the other nodes using the equation (3).

The method of detecting a relatively large change in the RWR distance is expressed as follows. An RWR distance from $x \in V$ to $y \in V$ at time t is represented as $d(x, y, t)$. Node sets $X \subset V$ and $Y \subset V$ are a pair of node sets (varying node set pair) in which the ratio of node pairs satisfying $d(x, y, t) - d(x, y, t-1) > \alpha$ ($\alpha$ is a positive real number) to all the node pairs $(x, y) \in \{X \times Y\}$ is $\beta$ ($\beta$ is a positive real number) or greater. Then, a varying node set pair in which the number of node pairs (the number of nodes of X×the number of nodes of Y) is $\gamma$ ($\gamma$ is a positive integer) or greater is detected from among a plurality of varying node set pairs, and information indicating the detected varying node set pair is provided. However, it is inefficient to calculate $d(x, y, t)$ for all the node pairs $(x, y) \in V$. This is because nodes around the added edge are more likely to relatively greatly contribute to a change in the RWR distance. Thus, before calculating RWR distances, the server 100 narrows down the node pairs on which operations are to be performed.

Figure 6:
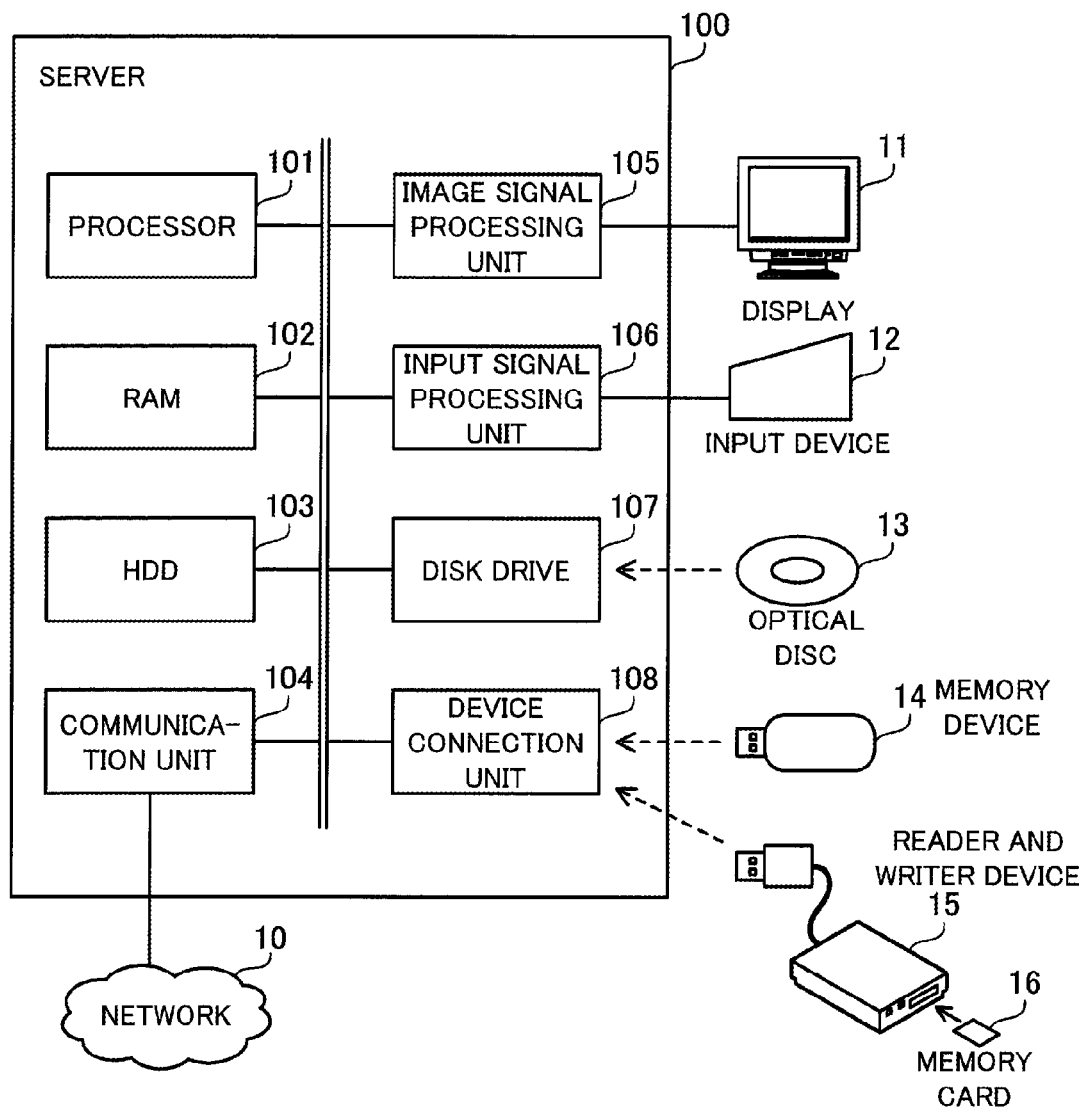
FIG. 6 illustrates an exemplary hardware configuration of a server according to the second embodiment.

FIG. 6 illustrates an exemplary hardware configuration of the server according to the second embodiment. The server 100 includes a processor 101, a RAM 102, an HDD 103, a communication unit 104, an image signal processing unit 105, an input signal processing unit 106, a disc drive 107, and a device connection unit 108. Each unit is connected to a bus of the server 100.

The processor 101 controls information processing performed by the server 100. The processor 101 may be a multiprocessor. Examples of the processor 101 include a CPU, a DSP, an ASIC, an FPGA, an MPU, a PLD, and the like. The processor 101 may be a combination of two or more of the CPU, DSP, ASIC, FPGA, MPU, and PLD.

The RAM 102 serves as a primary storage device of the server 100. The RAM 102 temporarily stores at least part of the OS program and application programs that are executed by the processor 101. The RAM 102 also stores various types of data that are used in processing performed by the processor 101.

The HDD 103 is a secondary storage device of the server 100. The HDD 103 magnetically writes data to and reads data from an internal magnetic disk. The HDD 103 stores the OS program, application programs, and various types of data. The server 100 may include other types of secondary storage devices such as a flash memory, an SSD, and the like, and may include a plurality of secondary storage devices.

The communication unit 104 is an interface capable of communicating with other computers via the network 10. The communication unit 104 may be a wired interface or a wireless interface.

The image signal processing unit 105 outputs an image to a display 11 connected to the server 100, in accordance with an instruction from the processor 101. Examples of the display 11 include a CRT display, a liquid crystal display, and the like.

The input signal processing unit 106 obtains an input signal from an input device 12 connected to the server 100, and outputs the input signal to the processor 101. Examples of the input device 12 include pointing devices (such as a mouse, a touch panel, and the like), a keyboard, and the like.

The disc drive 107 is a drive unit that reads programs and data from an optical disc 13 by using laser beams or the like. Examples of the optical disc 13 include a DVD, a DVD-RAM, a CD-ROM, a CD-R, a CD-RW, and the like. The disc drive 107 reads the programs and data from the optical disc 13, and stores the read programs and data in the RAM 102 or the HDD 103, in accordance with an instruction from the processor 101, for example.

The device connection unit 108 is a communication interface that connects peripheral devices to the server 100. For example, a memory device 14 and a reader and writer device 15 may be connected to the device connection unit 108. The memory device 14 is a recording medium having a function for communicating with the device connection unit 108. The reader and writer device 15 writes data to and reads data from a memory card 16. The memory card 16 is a card-type recording medium. The device connection unit 108 reads programs and data from the memory device 14 or the memory card 16, and stores the read programs and data in the RAM 102 or the HDD 103, in accordance with an instruction from the processor 101, for example.

Figure 7:
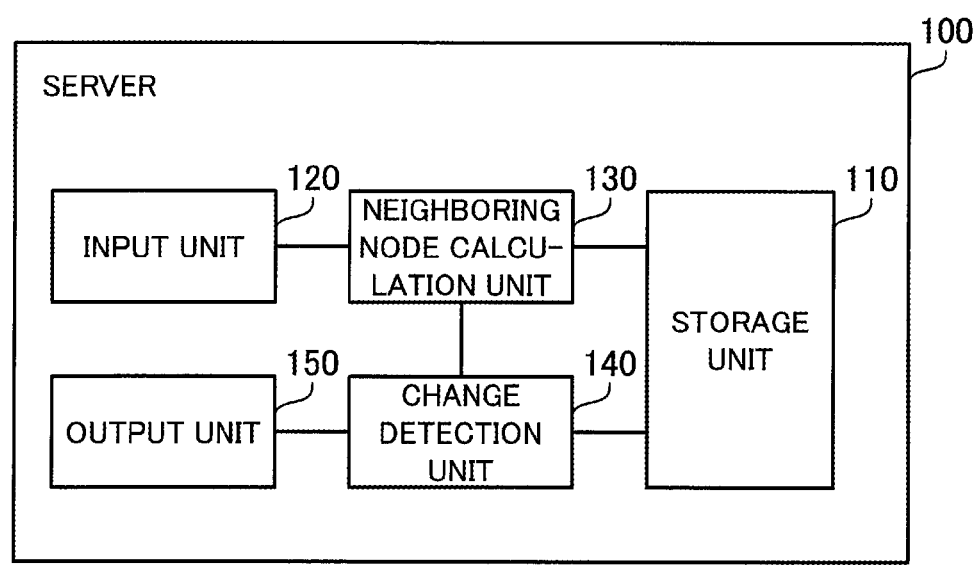
FIG. 7 illustrates an exemplary functional configuration of the server according to the second embodiment.

FIG. 7 illustrates an exemplary functional configuration of the server 100 according to the second embodiment. The server 100 includes a storage unit 110, an input unit 120, a neighboring node calculation unit 130, a change detection unit 140, and an output unit 150. The storage unit 110 may be realized as a storage area reserved in the RAM 102 or the HDD 103. The input unit 120, the neighboring node calculation unit 130, the change detection unit 140, and the output unit 150 may be realized as modules of software executed by the processor 101.

The storage unit 110 stores various types of information used in computations performed by the neighboring node calculation unit 130 and the change detection unit 140. The storage unit 110 may store in advance an adjacency matrix representing nodes and edges in the universal set V at each of a plurality of points of time.

The input unit 120 obtains an adjacency matrix representing nodes and edges in the universal set V at each of a plurality of points of time, and outputs the obtained adjacency matrix to the neighboring node calculation unit 130. The input unit 120 may obtain the adjacency matrix from another server and store the obtained adjacency matrix in the storage unit 110.

The neighboring node calculation unit 130 detects an edge (which may also be referred to as an "added edge") that is added between time t−1 and time t, based on the adjacency matrix representing a graph at time t−1 and the adjacency matrix representing a graph at time t which are obtained from the input unit 120 or the storage unit 110. The neighboring node calculation unit 130 calculates RWR distances from each node to nodes connected to the added edge. The neighboring node calculation unit 130 selects a subset of a plurality of nodes, based on the calculated RWR distances. The subset may also be referred to as a "neighboring node group". Further, nodes contained in a neighboring node group may also be referred to as "neighboring nodes".

The change detection unit 140 calculates first RWR distances from the neighboring nodes to each node, based on the graph at time t−1. Similarly, the change detection unit 140 calculates second RWR distances from the neighboring nodes to each node, based on the graph at time t. The change detection unit 140 detects a change in the communication condition between the time t−1 and time t by comparing the first and second RWR distances. The change detection unit 140 outputs the detection result to the output unit 150.

The output unit 150 presents the detection result of the change detection unit 140 to the user. For example, the output unit 150 causes the display 11 to display an image representing the detection result.

Figure 8:
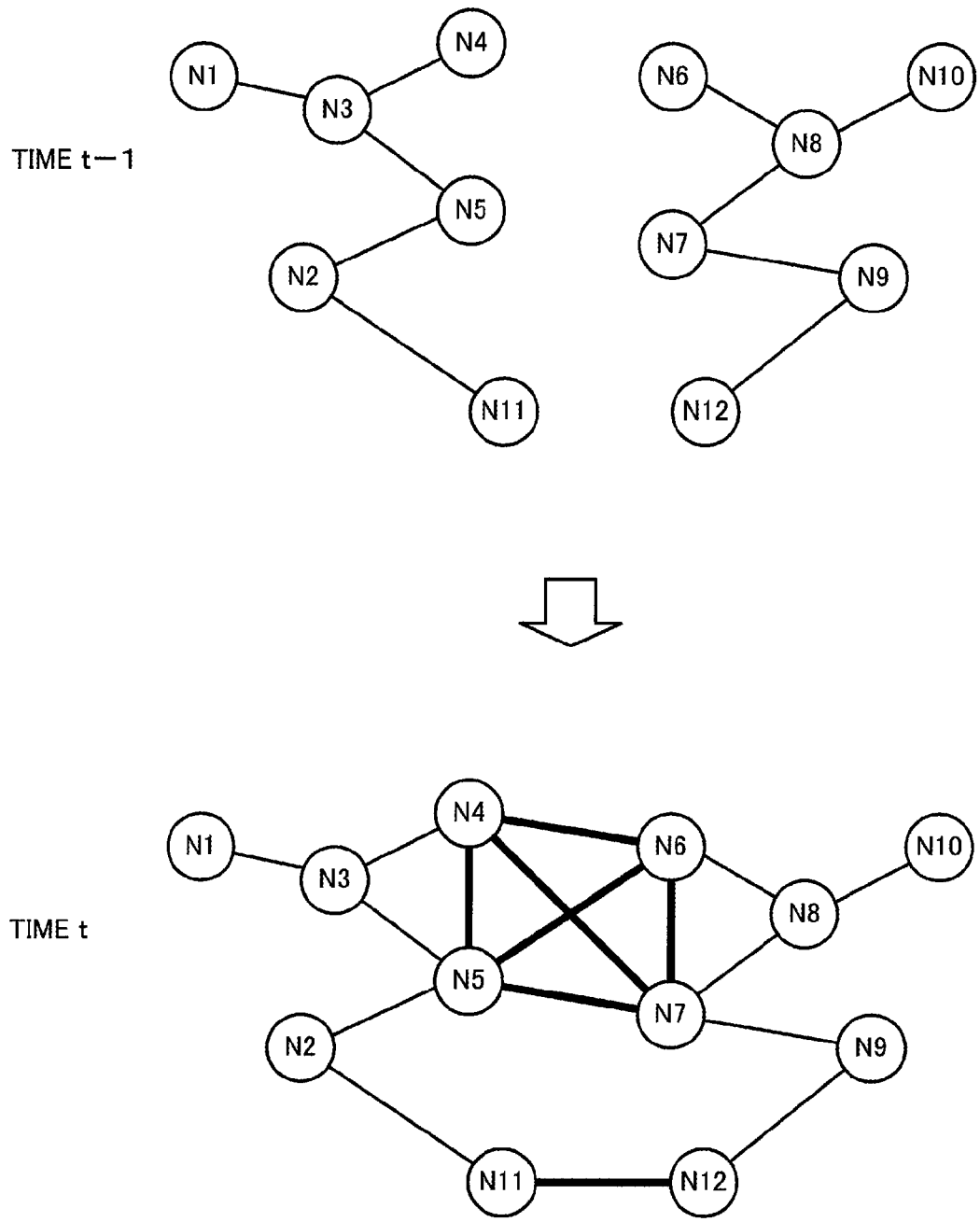
FIG. 8 illustrates an example of a part of a graph according to the second embodiment.

FIG. 8 illustrates an example of a part of a graph according to the second embodiment. A universal set V contains nodes N1, N2, N3, N4, N5, N6, N7, N8, N9, N10, N11, and N12. At time t−1, the following nodes are connected by an edge: nodes N1 and N3; nodes N2 and N5; nodes N2 and N11; nodes N3 and N4; nodes N3 and N5; nodes N6 and N8; nodes N7 and N8; nodes N7 and N9; nodes N8 and N10; and nodes N9 and N12.

At time t, in addition to the node pairs at time t−1, the following nodes are connected by an edge: nodes N4 and N5; nodes N4 and N6; nodes N4 and N7; nodes N5 and N6; nodes N5 and N7; nodes N6 and N7; and nodes N11 and N12.

In the following example, computations are performed on the nodes N1, N2, N3, N4, N5, N6, N7, N8, N9, N10, N11, and N12. However, the method described below may be applied to all the nodes contained in the universal set V.

Figure 9:
FIG. 9 illustrates examples of adjacency matrices according to the second embodiment.

FIG. 9 illustrates examples of adjacency matrices according to the second embodiment. An adjacency matrix $M_{t-1}$ represents the graph at time t−1 of FIG. 8. An adjacency matrix $M_t$ represents the graph at time t of FIG. 8. The numbers next to the rows and columns of the adjacency matrix indicate nodes. For example, indicates the node N1, and "2" indicates the node N2. The same notation is used in the following drawings.

For example, the neighboring node calculation unit 130 is capable of detecting an added edge by comparing the adjacency matrices $M_{t-1}$ and $M_t$. If a pair of nodes has "0" in the adjacency matrix $M_{t-1}$ but has "1" in the adjacency matrix $M_t$, this means that an edge is added between these nodes. In the case of the adjacency matrices $M_{t-1}$ and $M_t$, an edge connecting the nodes N4 and N5, an edge connecting the nodes N4 and N6, an edge connecting nodes N4 and N7, an edge connecting the nodes N5 and N6, an edge connecting the nodes N5 and N7, an edge connecting the nodes N6 and N7, and an edge connecting the nodes N11 and N12 are the added edges.

A matrix $D_{t-1}^{-1}$ corresponding to the adjacency matrix $M_{t-1}$ is represented by the following equation (4).

$$D_{t-1}^{-1} = \begin{array}{c} \\ 1 \\ 2 \\ 3 \\ 4 \\ 5 \\ \vdots \\ 12 \end{array} \begin{pmatrix} 1 & 2 & 3 & 4 & 5 & \ldots & 12 \\ 1 & 0 & 0 & 0 & 0 & \ldots & 0 \\ 0 & 1/2 & 0 & 0 & 0 & \ldots & 0 \\ 0 & 0 & 1/3 & 0 & 0 & \ldots & 0 \\ 0 & 0 & 0 & 1 & 0 & \ldots & 0 \\ 0 & 0 & 0 & 0 & 1/2 & \ldots & 0 \\ \vdots & \vdots & \vdots & \vdots & \vdots & \ddots & \vdots \\ 0 & 0 & 0 & 0 & 0 & \ldots & 1 \end{pmatrix} \quad (4)$$

Further, a matrix $D_t^{-1}$ corresponding to the adjacency matrix $M_t$ is represented by the following equation (5).

$$D_t^{-1} = \begin{array}{c} \\ 1 \\ 2 \\ 3 \\ 4 \\ 5 \\ \vdots \\ 12 \end{array} \begin{pmatrix} 1 & 2 & 3 & 4 & 5 & \ldots & 12 \\ 1 & 0 & 0 & 0 & 0 & \ldots & 0 \\ 0 & 1/2 & 0 & 0 & 0 & \ldots & 0 \\ 0 & 0 & 1/3 & 0 & 0 & \ldots & 0 \\ 0 & 0 & 0 & 1/4 & 0 & \ldots & 0 \\ 0 & 0 & 0 & 0 & 1/5 & \ldots & 0 \\ \vdots & \vdots & \vdots & \vdots & \vdots & \ddots & \vdots \\ 0 & 0 & 0 & 0 & 0 & \ldots & 1/2 \end{pmatrix} \quad (5)$$

Figure 10:
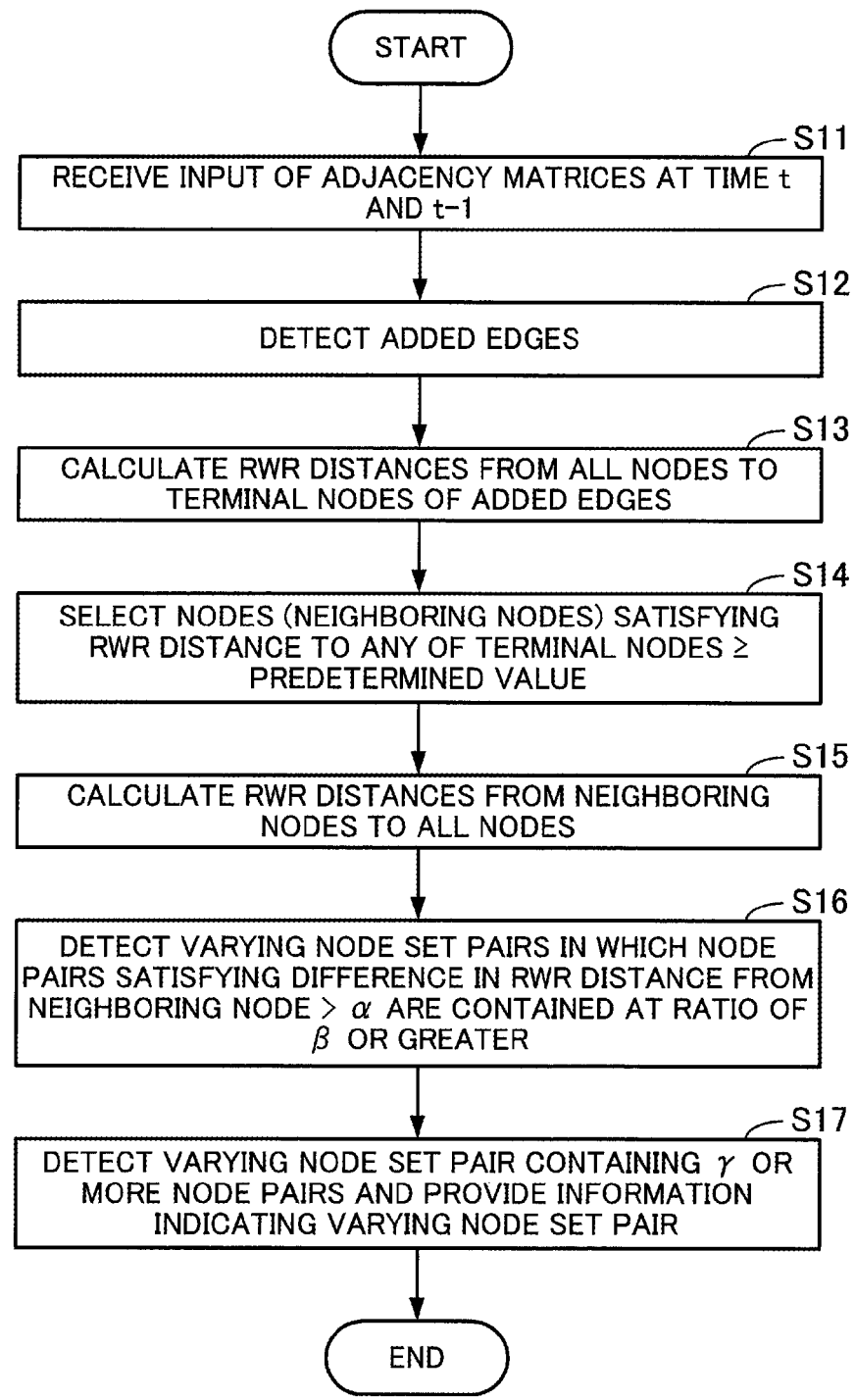
FIG. 10 is a flowchart of change detection according to the second embodiment.

FIG. 10 is a flowchart of change detection according to the second embodiment. In the following, the process illustrated in FIG. 10 will be described in order of step number.

(S11) The input unit 120 receives an input of the adjacency matrices $M_{t-1}$ and $M_t$. The input unit 120 outputs the adjacency matrices $M_{t-1}$ and $M_t$ to the neighboring node calculation unit 130.

(S12) The neighboring node calculation unit 130 detects added edges by comparing the adjacency matrices $M_{t-1}$ and $M_t$.

(S13) The neighboring node calculation unit 130 selects all the nodes as the starting points and the nodes (which may also be referred to as "terminal nodes") at the opposite ends of each added edge as the end points, and calculates RWR distances from each starting point to each end point using the equations (2) and (3). In the case of the adjacency matrices $M_{t-1}$ and $M_t$, the terminal nodes are nodes N4, N5, N6, N7, N11, and N12. The neighboring node calculation unit 130 does not need to calculate RWR distances to the nodes other than the terminal nodes. That is, the multiplication of the matrix and the column vector $e_j$ in the right-hand side of the equation (3) is performed only with respect to the rows of the matrix corresponding to the terminal nodes.

(S14) The neighboring node calculation unit 130 selects nodes (neighboring nodes) whose RWR distance to any of the terminal nodes is greater than a predetermined value. The neighboring node calculation unit 130 outputs the selected neighboring nodes to the change detection unit 140.

(S15) The change detection unit 140 calculates RWR distances from the neighboring nodes to all the nodes at time t−1, using the equations (2) and (3). Similarly, the change detection unit 140 calculates RWR distances from the neighboring nodes to all the nodes at time t. In this step, the change detection unit 140 does not need to calculate RWR distances from the nodes other than the neighboring nodes. As methods for limiting the starting nodes and calculating RWR distances to all the nodes, the following techniques may be used. For example, the calculation may be performed using the method disclosed in the document entitled "Fast Random Walk with Restart and Its Applications" (Hanghang Tong, Christos Faloutsos, and Jia-Yu Pan, Proceedings of ICDM2006, IEEE, 2006, p. 613-622). This method divides nodes into groups, performs inverse matrix calculation of a small transition probability matrix for each group, and summarizes a transition probability matrix across the groups by higher-order singular vectors. Thus, it is possible to perform approximate calculation of RWR distances using small memory space. Further, the calculation may be performed using the method disclosed in the document entitled "Fast and Exact Top-k Search for Random Walk with Restart" (Yasuhiro Fujiwara, Makoto Nakatsuji, Makoto Onizuka, and Masaru Kitsuregawa, PVLDB, volume 5, No. 5, PVLDB Endowment Inc., January 2012, p. 442-453). According to this method, an RWR distance matrix containing the RWR distances between all the nodes is held as the product of two sparse matrices. Thus, an RWR distance between two nodes is calculated as the product of the row and column vectors of each sparse matrix.

(S16) The change detection unit 140 detects varying node set pairs in which node pairs satisfying that the difference in the RWR distance from the neighboring node is greater than a are contained at a ratio of β or greater. The following methods may be used for extracting a varying node set pair. For example, the method disclosed in the document entitled "A Polynomial Time Delay Pseudo Clique Enumeration Algorithm" (Takeaki Uno, The Special Interest Group Technical Reports of IPSJ, IPSJ, AL, SIGAL Technical Reports, March 2007, p. 97-104) may be used. By applying the method disclosed in this document while regarding a varying node set pair as a pseudo clique in which the ratio of node pairs satisfying the difference in the RWR distance is greater than a to all the node pairs contained in the varying node set pair is β or greater, it becomes possible to efficiently detect a varying node set pair.

(S17) The change detection unit 140 detects a varying node set pair containing γ or more node pairs from among the detected varying node set pairs, and outputs information indicating the varying node set pair to the output unit 150. The output unit 150 provides the information indicating the varying node set pair to the user. For example, the output unit 150 may cause the display 11 to display an image (such as graphics and characters) indicating the location where a change has occurred in the universal set V.

FIG. 11 illustrates a first example of RWRs at time t−1 according to the second embodiment. In FIG. 11, a matrix 111 representing the RWR distances at time t−1 is illustrated which is obtained in step S13 of FIG. 10. The column number indicates the starting node. The row number indicates the end node. That is, the element (i, j) of the matrix 111 indicates the RWR distance from the node j to the node i (the same applies to the following matrices indicating RWR distances).

The neighboring node calculation unit 130 does not need to calculate RWR distances to the nodes N1, N2, N3, N8, N9, and N10 other than the terminal nodes. Therefore, it is possible to perform calculation with a reduced number of rows. In this example, the predetermined value in step S14 is 0.16. Then, the neighboring node calculation unit 130 selects the nodes N2, N3, N4, N5, N6, N7, N8, N9, N11, and N12 as neighboring nodes.

FIG. 12 illustrates a second example of RWRs at time t−1 according to the second embodiment. In FIG. 12, a matrix 112 representing the RWR distances at time t−1 is illustrated which is obtained in step S15 of FIG. 10. The change detection unit 140 does not need to calculate RWR distances from the nodes N1 and N10 other than the neighboring nodes. Therefore, it is possible to perform calculation with a reduced number of columns.

FIG. 13 illustrates an example of RWRs at time t according to the second embodiment. In FIG. 13, a matrix 113 representing the RWR distances at time t is illustrated which is obtained in step S15 of FIG. 10. Similar to the case of FIG. 12, the change detection unit 140 does not need to calculate RWR distances from the nodes N1 and N10 other than the neighboring nodes. Therefore, it is possible to perform calculation with a reduced number of columns.

FIG. 14 illustrates an example of a location where a change is detected according to the second embodiment. First, the change detection unit 140 calculates the difference between the matrix 113 (matrix R(t)) and the matrix 112 (matrix R(t−1)). In other words, the change detection unit 140 calculates R(t)−R(t−1).

Then, the change detection unit 140 extracts elements whose value is a or greater. Then, the change detection unit 140 selects a rectangular area in which the extracted elements are densely arranged (in which the ratio of the number of the extracted elements to the total number of elements contained in the rectangular area is β or greater). In the matrix 114, the rectangular area is selected based on the calculation result of R(t)−R(t−1). In this example, $\alpha=0.09$, $\beta=0.5$, and $\gamma=22$.

That is, the change detection unit 140 detects that the probability (RWR distance) that information is transmitted from the nodes N3, N4, N5, N6, N7, and N8 to the nodes N4, N5, N6, and N7 has changed more greatly than those between the other nodes. The output unit 150 notifies the user that the communication condition has changed in this area more greatly than the other locations.

Figure 15:
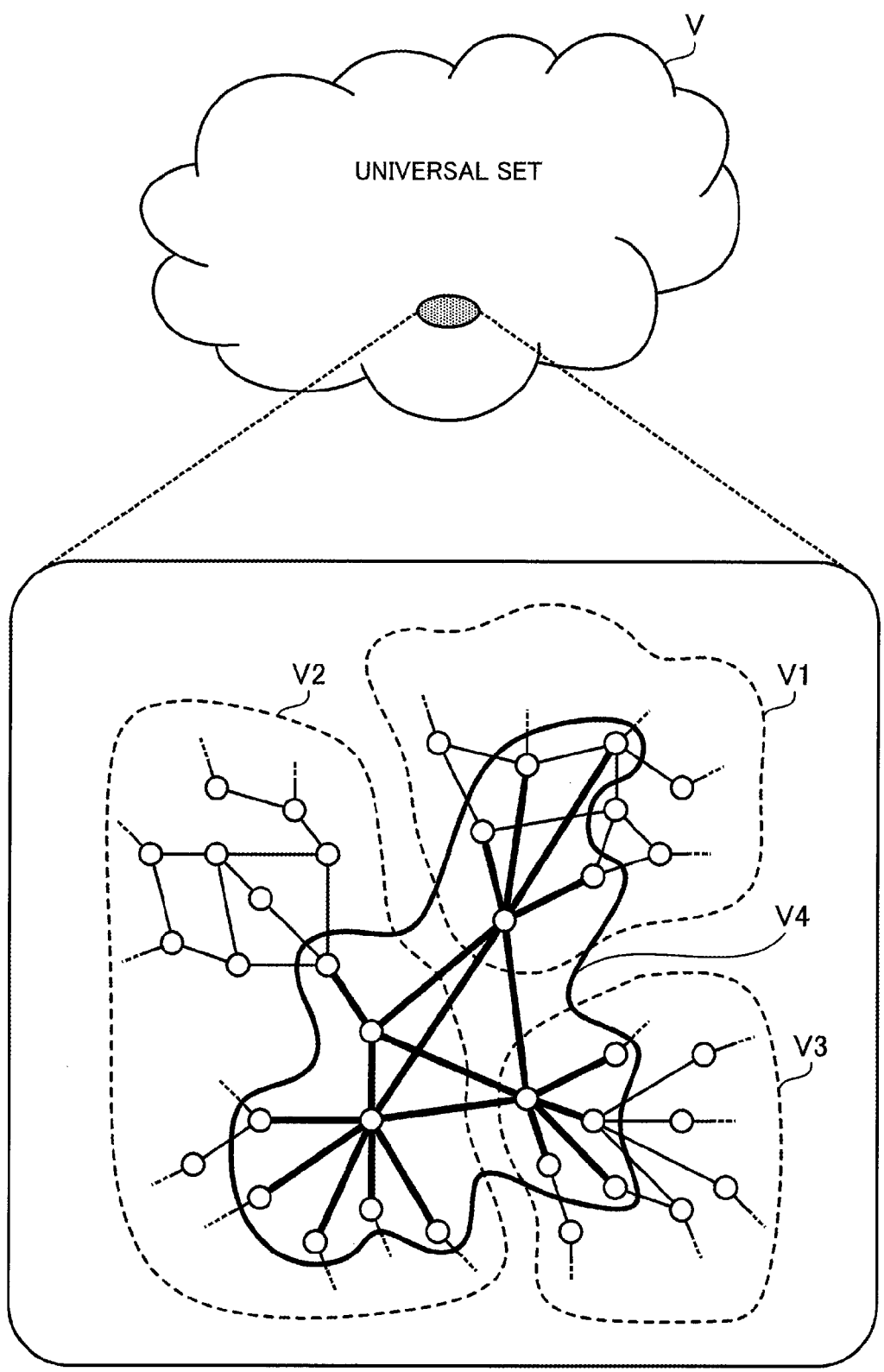
FIG. 15 illustrates an example of change detection according to the second embodiment.

FIG. 15 illustrates an example of change detection according to the second embodiment. The server 100 is capable of efficiently detecting a location where the communication condition has changed due to addition of edges from among nodes contained in the universal set V. For example, in the universal set V, new edges are formed between elements contained in the subgroups V1, V2, and V3. According to the above method, a subgroup V4 containing nodes whose communication condition has changed relatively greatly is obtained by selecting only the neighboring nodes as the starting points and calculating and analyzing RWR distances from the neighboring nodes. That is, when calculating RWR distances, operations are performed while excluding nodes which are less likely to greatly contribute to a change (nodes whose communication range is less likely to be greatly increased by addition of edges) from the subject of the operations. Accordingly, it is possible to reduce wasteful memory usage and the computation cost compared to the case of calculating RWR distances without limiting the starting nodes.

(c) Third Embodiment

Hereinafter, a third embodiment will be described. The following discussion is focused on the differences from the second embodiment, and a description of the same features as those described above will be omitted.

In the second embodiment, neighboring nodes are selected based on the RWR distances to all the terminal nodes connected to any of the added edges. However, in this calculation, the terminal edges that are selected as the end points may be further narrowed down. If neighboring nodes are selected after selecting only a relatively large node set in advance, it is possible to further reduce the subject of operations, and thus improve the efficiency of the operations. The third embodiment provides such a function.

An information processing system of the third embodiment is the same as the information processing system of the second embodiment illustrated in FIG. 3. Further, the hardware and functional configurations of a server of the third embodiment are the same as those of the server 100 of the second embodiment illustrated in FIGS. 6 and 7. Elements of the server and so on of the third embodiment are denoted by the same reference numerals as those used in the second embodiment.

Figure 16:
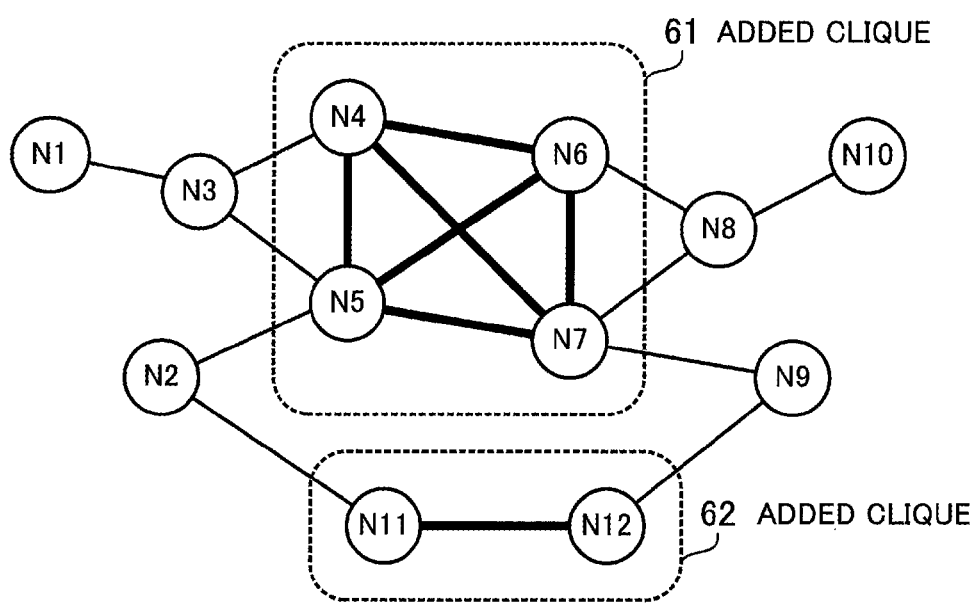
FIG. 16 illustrates examples of added cliques according to a third embodiment.

FIG. 16 illustrates examples of added cliques according to the third embodiment. A clique is a set of nodes in which there are edges between all the nodes. The clique that will be discussed in the third embodiment is one that satisfies a predetermined condition. The condition is that all the edges contained in the clique are added edges. A clique that satisfies this condition is hereinafter referred to as an "added clique". For example, the set of the nodes N3, N4, and N5 is a clique, but is not an added clique. However, a clique in which the ratio of added edges is equal to or greater than a threshold may be regarded as an added clique. For example, as will be described below, an added clique may be a pseudo clique.

In FIG. 16, added cliques 61 and 62 contained in the universal set V are illustrated. The added clique 61 contains the nodes N4, N5, N6 and N7. The added clique 62 contains the nodes N11 and N12.

Figure 17:
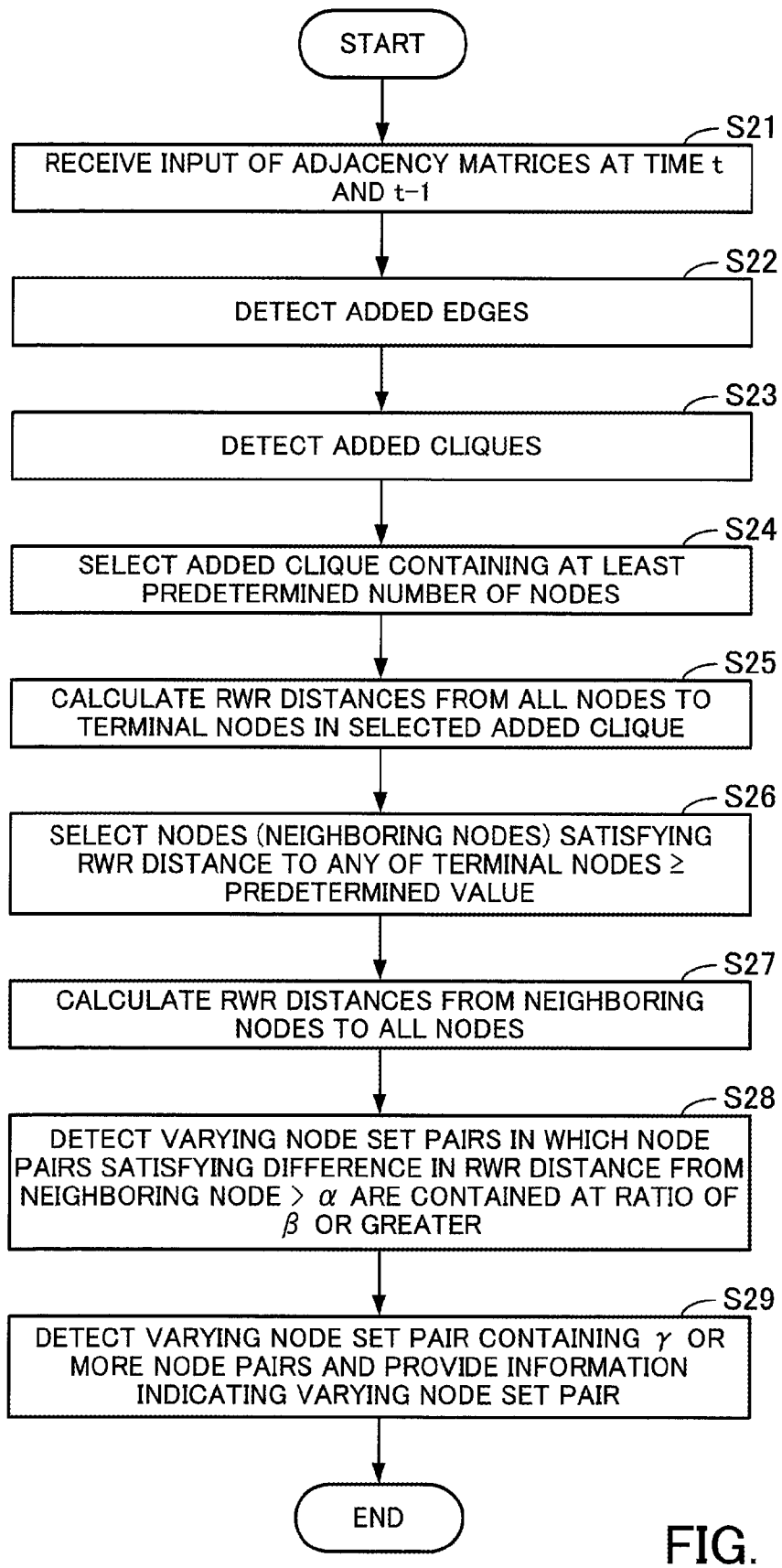
FIG. 17 is a flowchart of change detection according to the third embodiment.

FIG. 17 is a flowchart of change detection according to the third embodiment. In the following, the process illustrated in FIG. 17 will be described in order of step number.

(S21) The input unit 120 receives an input of the adjacency matrices $M_{t-1}$ and $M_t$. The input unit 120 outputs the adjacency matrices $M_{t-1}$ and $M_t$ to the neighboring node calculation unit 130.

(S22) The neighboring node calculation unit 130 detects added edges by comparing the adjacency matrices $M_{t-1}$ and $M_t$.

(S23) The neighboring node calculation unit 130 selects added cliques from among graphs formed with the added edges. The following method may be used for selecting an added clique. For example, the method disclosed in the document entitled "Fast Algorithms for Enumerating Cliques in Huge Graphs" (Takeaki Uno, IEICE Technical Report Vol. 103 No. 31, IEICE, 2003) may be used. According to this method, when enumerating cliques in a graph, if a node is not adjacent to an already detected clique, a determination of whether the node and a node in the already detected clique form a clique is omitted. This enables fast detection of a clique. By applying this method to a graph formed with added edges, it is possible to efficiently detect a clique.

(S24) The neighboring node calculation unit 130 selects an added clique containing at least a predetermined number of nodes. For example, the predetermined number is 3. Then, the neighboring node calculation unit 130 selects the added clique 61. This is because the number of nodes contained in the added clique 61 is 4, which is greater than the predetermined number 3. The neighboring node calculation unit 130 does not select the added clique 62. This is because the number of nodes contained in the added clique 62 is 2, which is less than the predetermined number 3.

(S25) The neighboring node calculation unit 130 selects all the nodes as the starting points, and calculates RWR distances to the terminal nodes contained in the added clique that is selected in step S24. For example, the neighboring node calculation unit 130 calculates RWR distances from all the nodes to the nodes N4, N5, N6 and N7 contained in the added clique 61. The details of the calculation are the same as those in step S13.

(S26) The neighboring node calculation unit 130 selects, as neighboring nodes, nodes whose RWR distance is greater than a predetermined value, based on the calculation result of step S25. The neighboring node calculation unit 130 outputs the selected neighboring nodes to the change detection unit 140.

(S27) The change detection unit 140 calculates RWR distances from the neighboring nodes to all the nodes at time t−1, using the equations (2) and (3). Similarly, the change detection unit 140 calculates RWR distances from the neighboring nodes to all the nodes at time t. In this step, the change detection unit 140 does not need to calculate RWR distances from the nodes other than the neighboring nodes. For example, the same technique as that used in step S15 may be employed for limiting the starting points to the neighboring nodes and calculating RWR distances.

(S28) The change detection unit 140 detects varying node set pairs in which node pairs satisfying that the difference in the RWR distance from the neighboring node is greater than $\alpha$ are contained at a ratio of $\beta$ or greater. For example, the same technique as that used in step S16 may be employed for detecting a varying node set pair.

(S29) The change detection unit 140 detects a varying node set pair containing $\gamma$ or more node pairs from among the detected varying node set pairs, and outputs information indicating the varying node set pair to the output unit 150. The output unit 150 provides the information indicating the varying node set pair to the user. For example, the output unit 150 may cause the display 11 to display an image (such as graphics and characters) indicating the location where a change has occurred in the universal set V.

Figure 18:
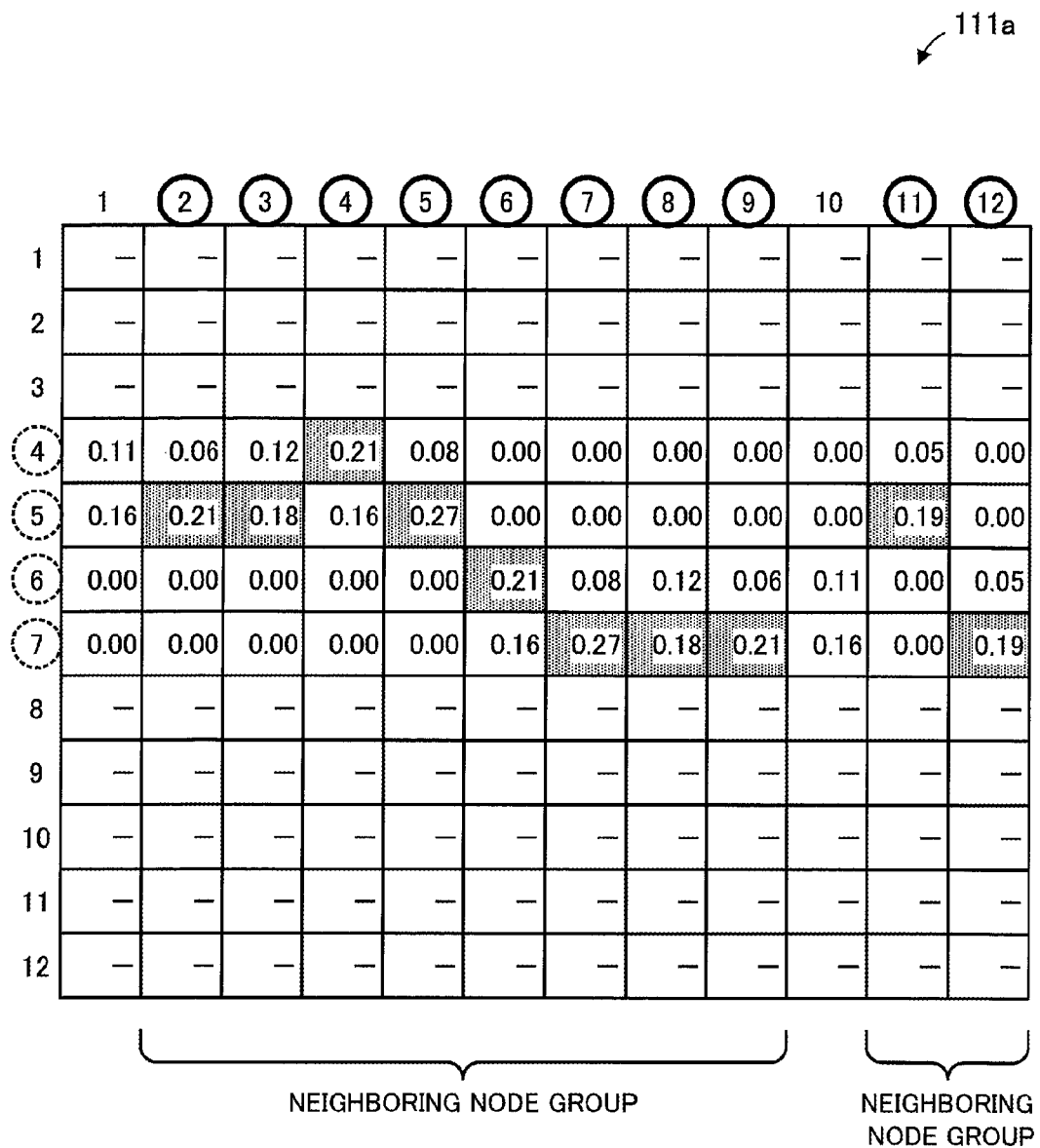
FIG. 18 illustrates an example of RWRs at time t−1 according to the third embodiment.

FIG. 18 illustrates an example of RWRs at time t−1 according to the third embodiment. In FIG. 18, a matrix 111*a* representing the RWR distances at time t−1 is illustrated which is obtained in step S25 of FIG. 17 in the case where the added clique 61 is selected in step S24. In this case, only the nodes N4, N5, N6, and N7 are selected as the terminal nodes. The neighboring node calculation unit 130 obtains the matrix 111*a* in place of the matrix 111 that is illustrated in the second embodiment. Compared to the matrix 111, in the matrix 111*a*, calculations for the nodes N11 and N12 are omitted. The neighboring node calculation unit 130 selects neighboring nodes based on the matrix 111*a*. If the predetermined value in step S26 is 0.16, the nodes N2, N3, N4, N5, N6, N7, N8, N9, N11, and N12 are selected as neighboring nodes.

In this way, since an added clique having a predetermined size or greater is selected in advance, it is possible to more efficiently perform calculation of RWR distances when selecting neighboring nodes. Further, since the neighboring nodes are narrowed down, it is possible to efficiently calculate RWR distances in the subsequent step. In the third embodiment, a clique whose edges are all added edges is selected as an added edge. However, a pseudo clique may be selected as an added clique.

Examples of pseudo cliques that may be regarded as added cliques are as follows: (1) A clique which contains existing edges and added edges and in which the ratio of added edges is equal to or greater than a predetermined value may be regarded as a pseudo clique. (2) A subgraph whose edges are all added edges, which is not a clique, and in which the ratio of added edges to all node pairs is equal to or greater than a predetermined threshold may be regarded as a pseudo clique. (3) A subgraph which contains one or more existing edges, which is not a clique, and in which the ratio of added edges to all node pairs is equal to or greater than a predetermined threshold may be regarded as a pseudo clique.

Added cliques are node sets in which a plurality of nodes are arranged more densely than in other node sets. That is, added cliques are more likely to greatly contribute to changes in the communication condition than other node sets. Therefore, it is possible to efficiently detect relatively large changes by selecting, as candidate neighboring nodes, nodes which are more likely to transmit information to added cliques.

(d) Fourth Embodiment

Hereinafter, a fourth embodiment will be described. The following discussion is focused on the differences from the second and third embodiments, and a description of the same features as those described above will be omitted.

The fourth embodiment provides a method of further narrowing down the neighboring nodes, in addition to the method of the third embodiment. An information processing system of the fourth embodiment is the same as the information processing system of the second embodiment illustrated in FIG. 3. Further, the hardware and functional configurations of a server of the fourth embodiment are the same as those of the server 100 of the second embodiment illustrated in FIGS. 6 and 7. Elements of the server and so on of the fourth embodiment are denoted by the same reference numerals as those used in the second embodiment.

Figure 19:
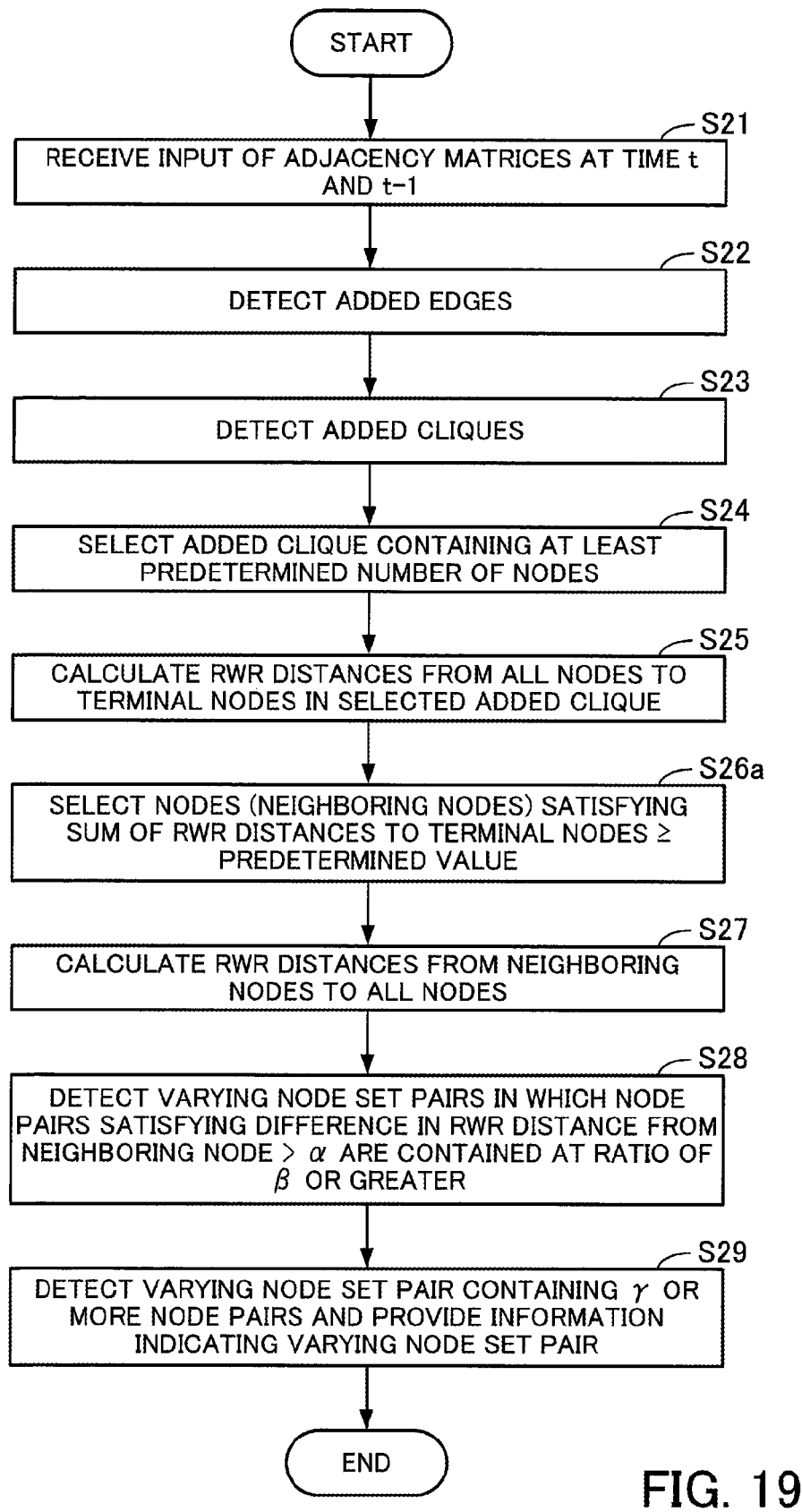
FIG. 19 is a flowchart of change detection according to a fourth embodiment.

FIG. 19 is a flowchart of change detection according to the fourth embodiment. In the following, the process illustrated in FIG. 19 will be described in order of step number. The fourth embodiment is different in that step S26*a* is performed in place of step S26 of FIG. 17. Accordingly, step S26*a* will be described, and a description of the other steps will be omitted. The step S26*a* is executed after step S25.

(S26*a*) The neighboring node calculation unit 130 selects, as neighboring nodes, nodes whose sum of RWR distances to the terminal nodes is greater than a predetermined value, based on the calculation result of step S25. The neighboring node calculation unit 130 outputs the selected neighboring nodes to the change detection unit 140. Then, the process proceeds to step S27.

There may be a case where a plurality of added cliques formed with added edges are present. In such a case, the sum of RWR distances to terminal nodes is calculated for each node on a per added clique basis. That is, a plurality of sums of RWR distances are calculated for each node. Then, if the sum of RWR distances to any of the added cliques is equal to or greater than a predetermined value, the node is selected as a neighboring node.

Alternatively, the sum of RWR distances to terminal nodes of the all the added cliques may be calculated for each node. Then, if the sum is equal to or greater than a predetermined value, the node may be selected as a neighboring node.

Figure 20:
FIG. 20 illustrates an example of RWRs at time t−1 according to the fourth embodiment.

FIG. 20 illustrates an example of RWRs at time t−1 according to the fourth embodiment. In FIG. 20, a matrix 111b representing the RWR distances at time t−1 is illustrated which is obtained in step S25 of FIG. 19 in the case where the added clique 61 is selected in step S24. Similar to the case of the matrix 111a, only the nodes N4, N5, N6, and N7 are selected as the terminal nodes. The neighboring node calculation unit 130 obtains the matrix 111b in place of the matrices 111 and 111a that are illustrated in the second and third embodiments, respectively.

Then, the neighboring node calculation unit 130 selects, as neighboring nodes, nodes whose sum of RWR distances to the terminal nodes is greater than a predetermined value, from among the starting nodes. In this example, the predetermined value in step S26a is 0.29. Then, the neighboring node calculation unit 130 selects the nodes N3, N4, N5, N6, N7, and N8 as neighboring nodes.

In this way, since an added clique having a predetermined size or greater is selected in advance, it is possible to more efficiently perform calculation for selecting neighboring nodes. Further, since the neighboring nodes are narrowed down, it is possible to efficiently calculate RWR distances in the subsequent step. For example, while there are 10 neighboring nodes in the second embodiment, there are only 6 neighboring nodes in the fourth embodiment. That is, when calculating RWR distances at times t and t−1, it is possible to further narrow down the neighboring nodes that are selected as the starting points of information. Accordingly, it is possible to further reduce wasteful memory usage and computation cost. Thus, it is possible to more efficiently detect changes in the communication condition.

As described in the second through fourth embodiments, the server 100 selects, as the starting points, only nodes (neighboring nodes) whose communication range is likely to be relatively greatly increased by addition of edges, and calculates RWR distances. Accordingly, it is possible to efficiently detect a large change in the communication condition due to a sudden reduction in the distance while using smaller memory space and lower computation cost than in the case of calculating RWR distances between all the nodes.

As mentioned above, the information processing in the first embodiment may be realized by causing the computing unit 1b to execute a program in the manner described above. Further, the information processing in the second embodiment may be realized by causing the processor 101 to execute a program. The program may be stored in a computer-readable recording medium (for instance, the optical disc 13, the memory device 14, the memory card 16, and the like).

For example, the program may be stored in a recording medium and distributed. Further, the program may be stored in another computer and distributed via a network. The computer may store (install) the program stored in the recording medium or the program received from the other computer in its storage device such as the RAM 102, the HDD 103, and so on, and may read and execute the program from the storage device.

According to one aspect, it is possible to efficiently detect a location where there is a relatively large change in the communication condition due to addition of edges.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A communication condition change detection method comprising:
    obtaining a first data set of a graph representing relationships among information entities at a first timing and a second data set of the graph representing relationships among the information entities at a second timing, the graph including a plurality of nodes representing the information entities that transmit, forward, and receive information and a plurality of edges representing relationships between the plurality of nodes;
    detecting an edge that is added between the first timing and the second timing among the edges;
    calculating, by a processor, with respect to respective first pairs of first nodes having direct or indirect relationships with second nodes coupled to the added edge and the second nodes, probabilities that information is transmitted from the first nodes to the second nodes and storing the calculated probabilities in association with the respective first pairs in a memory;
    selecting a subset of the plurality of nodes based on the calculated probabilities stored in the memory;
    selecting nodes included in the subset as starting points of information;
    calculating, with respect to respective second pairs of the selected nodes and other nodes having direct or indirect relationships with the selected nodes, first probabilities that information is transmitted from the selected nodes to the other nodes based on the first data set and storing the first probabilities in association with the respective second pairs in the memory;
    calculating, with respect to the respective second pairs, second probabilities that information is transmitted from the selected nodes to the other nodes based on the second data set and storing the second probabilities in association with the respective second pairs in the memory;
    detecting a change in the relationships between the first timing and the second timing by comparing the first probabilities with the second probabilities stored in the memory; and
    displaying, based on the detected change, information of partial graphs of the graph to a display, the partial graphs being separate from each other at the first timing but being connected to each other at the second timing, the information indicating a location where the detected change has occurred in the graph.

2. The communication condition change detection method according to claim 1, wherein:
    the obtaining includes detecting two or more added edges; and
    the calculating includes calculating probabilities that information is transmitted from each node to a plurality of nodes each coupled to any of the two or more added edges, and selecting the subset based on a highest probability among the probabilities calculated for each node serving as a starting point.

3. The communication condition change detection method according to claim 1, wherein:
    the obtaining includes detecting two or more added edges; and the calculating includes extracting an edge included in a subgraph that satisfies a predetermined condition from the two more added edges, and selecting nodes coupled to the extracted edge as end points of information, and calculating the probabilities that information is transmitted from each node.

4. The communication condition change detection method according to claim 3, wherein the calculating includes calculating, for each node serving as a starting point, a sum of the probabilities that information is transmitted to a plurality of nodes coupled to the extracted edge, and selecting the subset based on the sum.

5. The communication condition change detection method according to claim 3, wherein the subgraph that satisfies the predetermined condition is a clique having an edge between any two nodes to connect the two nodes.

6. An information processing apparatus for detecting a change of communication condition, the information processing apparatus comprising:
   a memory configured to store a first data set of a graph representing relationships among information entities at a first timing and a second data set of the graph representing relationships among the information entities at a second timing, the graph including a plurality of nodes representing the information entities that transmit, forward, and receive information and a plurality of edges representing relationships between the plurality of nodes; and
   a processor configured to perform a process including:
   detecting an edge that is added between the first timing and the second timing among the edges,
   calculating, with respect to respective first pairs of first nodes having direct or indirect relationships with second nodes coupled to the added edge and the second nodes, probabilities that information is transmitted from the first nodes to the second nodes and storing the calculated probabilities in association with the respective first pairs in a memory,
   selecting a subset of the plurality of nodes based on the calculated probabilities stored in the memory,
   selecting nodes included in the subset as starting points of information,
   calculating, with respect to respective second pairs of the selected nodes and other nodes having direct or indirect relationships with the selected nodes, first probabilities that information is transmitted from the selected nodes to the other nodes based on the first data set and storing the first probabilities in association with the respective second pairs in the memory;
   calculating, with respect to the respective second pairs, second probabilities that information is transmitted from the selected nodes to the other nodes based on the second data set and storing the second probabilities in association with the respective second pairs in the memory;
   detecting a change in the relationships between the first timing and the second timing by comparing the first probabilities with the second probabilities stored in the memory; and
   displaying, based on the detected change, information of partial graphs of the graph to a display, the partial graphs being separate from each other at the first timing but being connected to each other at the second timing, the information indicating a location where the detected change has occurred in the graph.

7. A non-transitory computer-readable storage medium storing a computer program that causes a computer to perform a process comprising:
   obtaining a first data set of a graph representing relationships among information entities at a first timing and a second data set of the graph representing relationships among the information entities at a second timing, the graph including a plurality of nodes representing the information entities that transmit, forward, and receive information and a plurality of edges representing relationships between the plurality of nodes;
   detecting an edge that is added between the first timing and the second timing among the edges;
   calculating, with respect to respective first pairs of first nodes having direct or indirect relationships with second nodes coupled to the added edge and the second nodes, probabilities that information is transmitted from the first nodes to the second nodes coupled to the added edge and storing the calculated probabilities in association with the respective first pairs in a memory;
   selecting a subset of the plurality of nodes based on the calculated probabilities stored in the memory;
   selecting nodes included in the subset as starting points of information;
   calculating, with respect to respective second pairs of the selected nodes and other nodes having direct or indirect relationships with the selected nodes, first probabilities that information is transmitted from the selected nodes to the other nodes based on the first data set and storing the first probabilities in association with the respective second pairs in the memory;
   calculating, with respect to the respective second pairs, second probabilities that information is transmitted from the selected nodes to the other nodes based on the second data set and storing the second probabilities in association with the respective second pairs in the memory;
   detecting a change in the relationships between the first timing and the second timing by comparing the first probabilities with the second probabilities stored in the memory; and
   displaying, based on the detected change, information of partial graphs of the graph to a display, the partial graphs being separate from each other at the first timing but being connected to each other at the second timing, the information indicating a location where the detected change has occurred in the graph.

* * * * *